US011240341B2

(12) United States Patent
Besehanic

(10) Patent No.: US 11,240,341 B2
(45) Date of Patent: *Feb. 1, 2022

(54) METHODS AND APPARATUS TO MEASURE EXPOSURE TO STREAMING MEDIA USING MEDIA WATERMARKS

(71) Applicant: The Nielsen Company (US), LLC, New York, NY (US)

(72) Inventor: Jan Besehanic, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,175

(22) Filed: Jun. 8, 2020

(65) Prior Publication Data

US 2020/0304597 A1    Sep. 24, 2020

Related U.S. Application Data

(63) Continuation of application No. 16/059,022, filed on Aug. 8, 2018, now Pat. No. 10,681,174, which is a
(Continued)

(51) Int. Cl.
*G06F 15/16* (2006.01)
*H04L 29/08* (2006.01)
*H04L 29/06* (2006.01)

(52) U.S. Cl.
CPC .......... *H04L 67/32* (2013.01); *H04L 65/4084* (2013.01); *H04L 65/80* (2013.01)

(58) Field of Classification Search
CPC ...... H04L 67/32; H04L 67/4084; H04L 65/80
See application file for complete search history.

(56) References Cited

U.S. PATENT DOCUMENTS

| 5,862,325 A | * | 1/1999 | Reed | .................. H04L 29/06 704/270.1 |
| 8,631,088 B2 | * | 1/2014 | Robbin | .................. G06F 16/178 709/217 |

(Continued)

FOREIGN PATENT DOCUMENTS

| WO | 2012177866 | 12/2012 |
| WO | 2012177870 | 12/2012 |

(Continued)

OTHER PUBLICATIONS

International Bureau, "International Preliminary Report on Patentability", issued in connection with International Patent Application No. PCT/US2014/068424, dated Apr. 13, 2017 (9 pages). (Copy not provided—Document available in Parent U.S. Appl. No. 14/502, 434.).

(Continued)

*Primary Examiner* — Phuoc H Nguyen
(74) *Attorney, Agent, or Firm* — Hanley, Flight & Zimmerman, LLC

(57) ABSTRACT

Methods and apparatus are disclosed to measure exposure to streaming media using media watermarks. An example apparatus includes a memory, and a logic circuit to cause transmission of media, received from a service provider, to a media device in response to a first request for the media, the media including instructions to cause the media device to (1) determine a source Uniform Resource Locator, (2) determine a current playback time of the media, and (3) transmit a second request for metadata of the media to the apparatus, and metadata associated with the source Uniform Resource Locator and the current playback time of the media, the second request including the source Uniform Resource Locator of the media and the current playback time of the media. Example systems, methods, and appara-
(Continued)

tus disclosed herein enable a single set of monitoring instructions to be operated on multiple different devices and/or browsers.

21 Claims, 18 Drawing Sheets

Related U.S. Application Data continuation of application No. 14/502,434, filed on Sep. 30, 2014, now abandoned.

(56) References Cited

U.S. PATENT DOCUMENTS

| | | | |
|---|---|---|---|
| 8,752,085 B1* | 6/2014 | Brueck | H04N 21/4305 725/32 |
| 9,197,421 B2 | 11/2015 | Besehanic | |
| 9,209,978 B2 | 12/2015 | Besehanic | |
| 9,210,208 B2* | 12/2015 | Ramaswamy | H04N 21/2353 |
| 9,313,544 B2 | 4/2016 | Besehanic | |
| 9,332,035 B2* | 5/2016 | Ramaswamy | H04L 65/4092 |
| 9,357,261 B2 | 5/2016 | Besehanic | |
| 9,380,356 B2* | 6/2016 | McMillan | H04H 20/31 |
| 9,515,904 B2 | 12/2016 | Besehanic et al. | |
| 10,142,687 B2* | 11/2018 | Gurha | H04N 21/4758 |
| 10,277,669 B1* | 4/2019 | Joliveau | H04L 65/4084 |
| 10,504,200 B2* | 12/2019 | Winograd | G06F 16/9566 |
| 2002/0095454 A1* | 7/2002 | Reed | H04L 67/28 709/201 |
| 2005/0235047 A1* | 10/2005 | Li | H04L 29/06027 709/219 |
| 2006/0159109 A1* | 7/2006 | Lamkin | G11B 27/34 370/401 |
| 2006/0161635 A1* | 7/2006 | Lamkin | G06F 16/4387 709/217 |
| 2006/0242325 A1* | 10/2006 | Ramaswamy | H04N 21/4349 709/246 |
| 2007/0005791 A1* | 1/2007 | Goulden | G06Q 30/0277 709/231 |
| 2007/0118853 A1* | 5/2007 | Kreitzer | H04L 65/4084 725/46 |
| 2007/0162927 A1 | 7/2007 | Ramaswamy et al. | |
| 2008/0195664 A1* | 8/2008 | Maharajh | H04L 67/306 |
| 2008/0249961 A1* | 10/2008 | Harkness | H04N 21/44222 705/400 |
| 2009/0150557 A1* | 6/2009 | Wormley | H04N 21/4307 709/231 |
| 2009/0158318 A1* | 6/2009 | Levy | G06F 21/36 725/32 |
| 2010/0042499 A1* | 2/2010 | Barton | G06Q 30/02 705/14.53 |
| 2010/0042749 A1* | 2/2010 | Barton | G06Q 30/0277 710/1 |
| 2011/0055352 A1* | 3/2011 | Choi | H04L 65/4084 709/219 |
| 2012/0089911 A1 | 4/2012 | Hosking et al. | |
| 2012/0239690 A1* | 9/2012 | Asikainen | G06F 16/7867 707/770 |
| 2012/0265735 A1* | 10/2012 | McMillan | H04N 21/44204 707/687 |
| 2012/0265853 A1 | 10/2012 | Knox et al. | |
| 2013/0007298 A1* | 1/2013 | Ramaswamy | H04L 65/607 709/231 |
| 2013/0166580 A1* | 6/2013 | Maharajh | H04W 4/18 707/758 |
| 2013/0212222 A1 | 8/2013 | Outlaw | |
| 2013/0268623 A1* | 10/2013 | Besehanic | H04L 65/80 709/217 |
| 2013/0268630 A1* | 10/2013 | Besehanic | H04L 65/80 709/219 |
| 2013/0290508 A1 | 10/2013 | Besehanic et al. | |
| 2013/0291001 A1 | 10/2013 | Besehanic et al. | |
| 2014/0047468 A1 | 2/2014 | Nielsen | |
| 2014/0082220 A1* | 3/2014 | Ramaswamy | H04N 21/4349 709/246 |
| 2014/0244607 A1* | 8/2014 | Hedinsson | G06F 16/4387 707/705 |
| 2014/0244828 A1* | 8/2014 | Besehanic | H04L 65/602 709/224 |
| 2014/0289241 A1* | 9/2014 | Anderson | G06F 16/48 707/736 |
| 2015/0106505 A1* | 4/2015 | Ramaswamy | H04N 21/812 709/224 |
| 2015/0128162 A1* | 5/2015 | Ionescu | H04N 21/44209 725/14 |
| 2015/0237056 A1 | 8/2015 | Arnold et al. | |
| 2015/0245110 A1* | 8/2015 | Alsina | H04N 21/4722 725/34 |
| 2015/0261753 A1* | 9/2015 | Winograd | G06F 16/9566 707/736 |
| 2015/0324947 A1* | 11/2015 | Winograd | G06F 16/9566 382/100 |
| 2015/0339274 A1* | 11/2015 | Pappu | H04N 21/4122 715/205 |
| 2016/0043916 A1 | 2/2016 | Ramaswamy et al. | |
| 2016/0050456 A1 | 2/2016 | Arini et al. | |
| 2016/0164761 A1* | 6/2016 | Sathyanarayana | H04L 65/4084 709/219 |
| 2016/0198220 A1 | 7/2016 | Yamagishi | |
| 2018/0352052 A1 | 12/2018 | Besehanic | |

FOREIGN PATENT DOCUMENTS

| | | |
|---|---|---|
| WO | 2012177872 | 12/2012 |
| WO | 2012177874 | 12/2012 |

OTHER PUBLICATIONS

International Searching Authority, "International Search Report", issued in connection with International Patent Application No. PCT/US2014/068424, dated May 28, 2015 (3 pages). (Copy not provided—Document available n Parent U.S. Appl. No. 14/502,434.).

International Searching Authority, "Written Opinion", issued in connection with International Patent Application No. PCT/US2014/068424, dated May 28, 2015 (7 pages). (Copy not provided—Document available in Parent U.S. Appl. No. 14/502,434.).

United States Patent and Trademark Office, "Non-Final Office Action," issued in connection with U.S. Appl. No. 14/502,434, dated Jan. 11, 2017, 22 pages. (Copy not provided as this is a USPTO document. Applicantwill provide document upon request from Examiner.).

United States Patent and Trademark Office, "Final Office Action," issued in connection with U.S. Appl. No. 14/502,434, dated May 18, 2017, 25 pages. (Copy not provided as this is a USPTO document. Applicant will provide document upon request from Examiner.).

United States Patent and Trademark Office, "Non-Final Office Action," issued in connection with U.S. Appl. No. 14/502,434, dated Sep. 27, 2017, 31 pages. (Copy not provided as this is a USPTO document. Applicantwill provide document upon request from Examiner.).

United States Patent and Trademark Office, "Final Office Action," issued in connection with U.S. Appl. No. 14/502,434, dated May 8, 2018, 33 pages. (Copy not provided as this is a USPTO document. Applicant will provide document upon request from Examiner.).

United States Patent and Trademark Office,"Notice of Allowance and Fee(s) Due," issued in connection with U.S. Appl. No. 16/059,022, dated Feb. 5, 2020, 8 pages. (Copy not provided as this is a USPTO document. Applicantwill provide document upon request from Examiner.).

United States Patent and Trademark Office, "Non-Final Office Action," issued in connection with U.S. Appl. No. 16/059,022, dated Aug. 23, 2019, 9 pages. (Copy not provided as this is a

(56) References Cited

OTHER PUBLICATIONS

USPTO document. Applicanl will provide document upon request from Examiner.).

* cited by examiner

400

| | 410 | 420 | 430 |
|---|---|---|---|
| | SOURCE UNIVERSAL RESOURCE LOCATOR (URL) | TIME WITHIN MEDIA | METADATA |
| 450 | SERVICE_PROVIDER. COM/MEDIA1.MPG | 00:00:10 | ID3 METADATA 001 |
| 460 | SERVICE_PROVIDER. COM/MEDIA1.MPG | 00:00:20 | ID3 METADATA 002 |
| 470 | SERVICE_PROVIDER. COM/MEDIA2.MPG | 00:00:10 | ID3 METADATA 010 |
| | | ... | |

FIG. 4

METHODS AND APPARATUS TO MEASURE EXPOSURE TO STREAMING MEDIA USING MEDIA WATERMARKS

RELATED APPLICATIONS

This patent arises from a continuation of U.S. patent application Ser. No. 16/059,022, now U.S. Pat. No. 10,681, 174, filed on Aug. 8, 2018, which is a continuation of U.S. patent application Ser. No. 14/502,434, filed on Sep. 30, 2014. U.S. patent application Ser. No. 14/502,434 and U.S. patent application Ser. No. 16/059,022 are hereby incorporated herein by reference in their entirety.

FIELD OF DISCLOSURE

This disclosure relates generally to measuring media exposure, and, more particularly, to methods and apparatus to measure exposure to streaming media.

BACKGROUND

Streaming enables media to be delivered to and presented by a wide variety of media presentation devices, such as desktop computers, laptop computers, tablet computers, personal digital assistants, smartphones, etc. A significant portion of media (e.g., content and/or advertisements) is presented via streaming to such devices.

BRIEF DESCRIPTION OF THE DRAWINGS

FIG. 4 is an example data table that may be used to store metadata in association with a source universal resource locator (URL) and a time within media.

Wherever possible, the same reference numbers will be used throughout the drawing(s) and accompanying written description to refer to the same or like parts.

DETAILED DESCRIPTION

Figure 1:
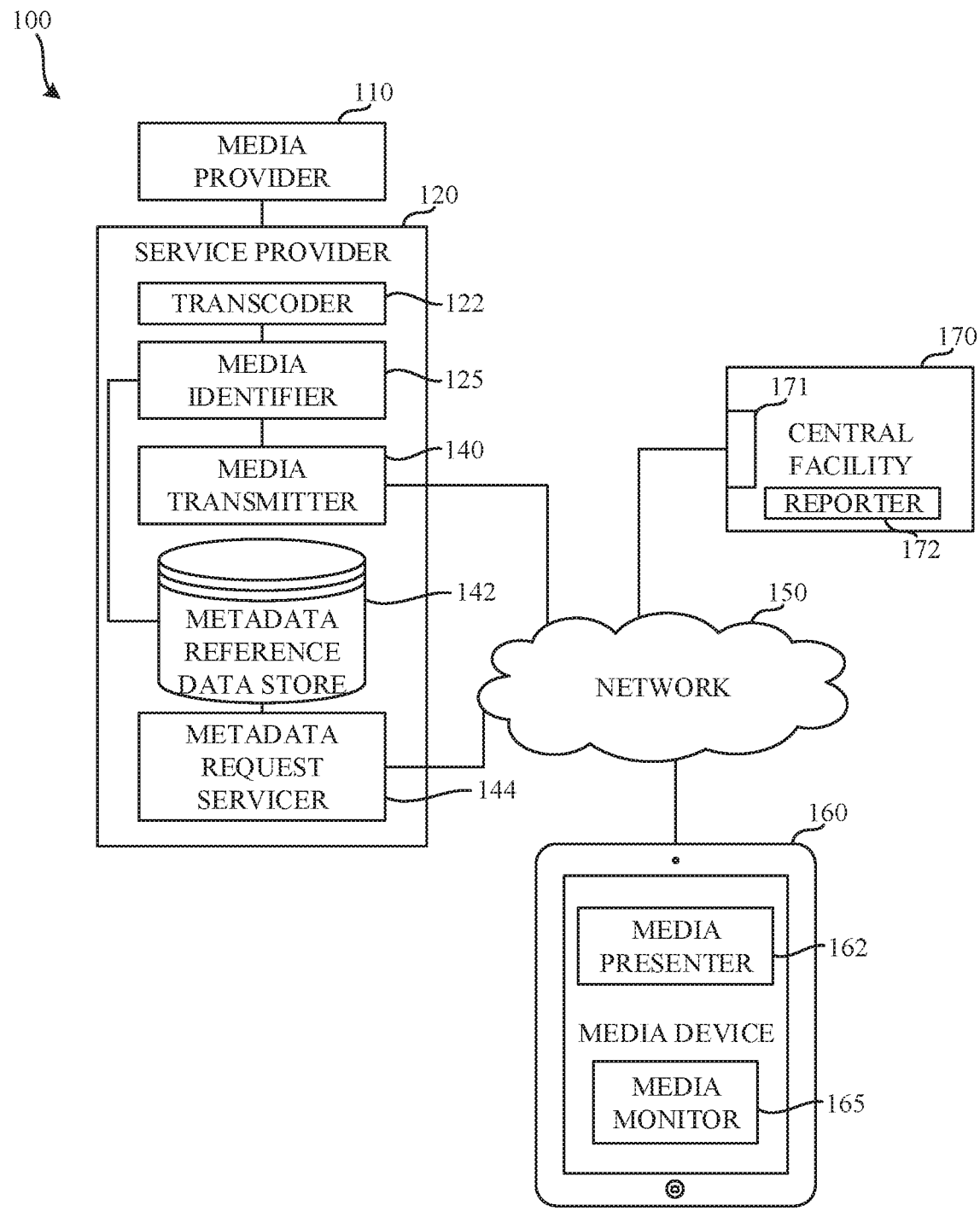
FIG. 1 is a diagram of an example system for measuring exposure to streaming media.

The use of mobile devices (e.g., smartphones, tablets, MP3 players, etc.) to view media has increased in recent years. Initially, service providers created custom applications (e.g., apps) to display their media. As more types of mobile devices having different software requirements, versions, compatibilities, etc., entered the market, service providers began displaying streaming media in a browser of the mobile device. Consequently, many users view streaming media via the browser of their mobile device. Understanding how users interact with streaming media (e.g., such as by understanding what media is presented, how the media is presented, etc.) provides valuable information to service providers, advertisers, media providers (e.g., providers of content), manufacturers, and/or other entities.

Example methods, apparatus, systems, and articles of manufacture disclosed herein may be used to measure exposure to streaming media. Some such example methods, apparatus, and/or articles of manufacture measure such exposure based on media metadata, user demographics, and/or media device types. Some examples disclosed herein may be used to monitor streaming media transmissions received at client devices such as personal computers, tablets (e.g., an iPad®), portable devices, mobile phones, Internet appliances, and/or any other device capable of playing media. Example monitoring processes disclosed herein store metadata associated with media at a metadata reference data store which, when queried with data representing a source of media and a current time of presentation within the media, provides metadata associated with the media presentation. As such, media devices are relieved of the necessity to locally determine and/or extract metadata from media and, instead, can request the metadata from a remote location. The media device may then relay the requested metadata to a central facility along with a user identifier and/or a device identifier, which may be used to associate the metadata with demographics information of user(s) of the media device(s).

In this manner, detailed exposure metrics are generated based on collected media metadata and associated user demographics. As used herein, the term "metadata" is defined to be data that describes other data. In examples disclosed herein, metadata is used to describe and/or identify media. As such, metadata may be any data in any format that may be used for identifying media.

As used herein, the term "media" includes any type of content and/or advertisement (e.g., audio and/or video (still or moving) content and/or advertisement) delivered via any type of distribution medium. Thus, media includes television programming, television advertisements, radio programming, radio advertisements, movies, web sites, streaming media, television commercials, radio commercials, Internet ads, etc. Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

Audio watermarking is a technique used to identify media such as television broadcasts, radio broadcasts, advertisements (television and/or radio), downloaded media, streaming media, prepackaged media, etc. Existing audio watermarking techniques identify media by including (e.g., embedding) one or more codes (e.g., one or more watermarks), such as media identifying information and/or an identifier that may be mapped to media identifying information, into a media signal (e.g., into an audio and/or video component of a media signal). In some examples, the audio or video component is selected to have a signal characteristic sufficient to hide the watermark. As used herein, the terms "code" or "watermark" are used interchangeably and are defined to mean any identification information (e.g., an identifier) that may be inserted in, transmitted with, or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the signal(s) representing the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media and/or the signal representing the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were disclosed in Thomas, U.S. Pat. No. 5,481,294, which is hereby incorporated by reference in its entirety.

As discussed above, media presented by a media device has sometimes been monitored by detecting the presence of audio watermarks. However, detection of audio watermarks can sometimes be difficult to implement. Monitoring audio watermarks using a media device is difficult because, for example, the media device may not have a microphone to detect audio watermarks, the media device may not enable programmatic access to an audio buffer, etc. Furthermore, after the audio is detected (e.g., by accessing an audio buffer, by accessing a microphone, etc.), processing the audio to detect the watermark consumes processor resources of the media device, thereby draining a battery of the media device and potentially affecting how a user uses and/or experiences the media device. Affecting how a user uses and/or experiences a media device is undesirable because it may impact the results of the monitoring effort (e.g., by monitoring changed behavior instead of behavior in the absence of monitoring). Moreover, taxing the resources of a media device may adversely affect its performance (e.g., cause slow response times, interfere with media display, and/or otherwise negatively affect the devices operation).

To enable monitoring, monitoring entities embed metadata in media to enable collection of the metadata and generation of media exposure reports. Some systems embed metadata in a closed captioning transport stream, a metadata channel of a transport stream, a separate timed text track, etc. Some such systems provide media devices with monitoring instructions to cause the media devices to return, store, and/or forward the metadata to a remote data collection site. Example systems for embedding metadata into media are described in U.S. patent application Ser. Nos. 13/341,646, 13/341,661, 13/443,596, 13/793,991, 13/445,961, 13/793,974, 13/472,170, 13/767,548, 13/793,959, and 13/778,108, which are incorporated by reference in their entirety.

Different media devices may be implemented with different browsers and/or media presentation functionality. Monitoring instructions to retrieve metadata may function differently on different media devices. Accordingly, some known media monitoring approaches are not cross-platform compatible. For example, while instructions for retrieving metadata from a metadata channel of a transport stream may function properly on a first system (e.g., an Apple iPad), they may not function properly on a second system (e.g., an Android Tablet). Maintaining different sets of instructions and/or ensuring the correct type of instructions are provided to the correct type of device is a very difficult technical problem. Example systems, methods, and apparatus disclosed herein overcome this problem by enabling a single set of monitoring instructions to be operated on multiple different devices and/or browsers. In examples disclosed herein, the monitoring instructions collect a source universal resource locator (URL) and a current time of the media, and request metadata associated with the media from a remote metadata request servicer, which performs a lookup of the metadata based on the provided source URL and current time of the media. The metadata and a user identifier and/or device identifier is received by the consumer media device executing the monitoring instruction and then relayed to a central facility for collection and reporting.

In some examples, media identifying data (e.g., a code, a signature, a watermark, a fingerprint, etc.) having a first format is extracted at a service provider headend or the like from media decoded from a transport stream. In some such examples, the transport stream corresponds to a Moving Picture Experts Group (MPEG) 4 transport stream sent according to a hypertext transfer protocol (HTTP) live streaming (HLS) protocol. An example of media identifying data having the first format is an audio watermark that is embedded in an audio portion of the media. Additionally or alternatively, the media identifying data having the first format may be a video (e.g., image) watermark that is embedded in a video portion of the media. In some examples, the extracted media identifying data having the first format is transcoded into media identifying data having a second format. The media identifying data having the second format may correspond to, for example, metadata represented in a string format, such as an ID3 tag for transmission to a requesting media monitor upon receipt of a request for the metadata.

Some example methods disclosed herein to monitor streaming media include inspecting a media file received at a consumer media device from a service provider. These example methods also include generating media presentation data for reporting to an audience measurement entity. As used herein, media presentation data includes media identifying data (e.g., metadata) and/or other parameters related to the media presentation such as, for example, a current time of presentation within the media, a duration of the media, a source of the media (e.g., a universal resource locator (URL) of a service provider, a name of a service provider, a channel, etc.), metadata of the media presenter (e.g., a display size of the media, a volume setting, etc.), a timestamp, a user identifier, and/or device identifier, etc.

In some examples, media monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In some examples, the media presentation data is aggregated to determine audience size(s) of different media, demographics associated with audience(s) of different media, etc. In some other examples, the aggregated device oriented information and the aggregated audience oriented information of the above examples are combined to identify audience sizes, demographics, etc. for media as presented on different type(s) of devices. In examples disclosed herein, media presentation data includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.). "Applications" are sometimes referred to as "apps".

In some disclosed examples, streaming media is delivered to the media device using HTTP Live Streaming (HLS). However, any other past, present, and/or future method of streaming media to the media device may additionally or alternatively be used such as, for example, an HTTP Secure (HTTPS) protocol. HLS transport streams allow media to be transmitted to the media device in short duration segments (e.g., three second segments, five second segments, thirty second segments, etc.). In some disclosed examples, a media device uses a browser to display media received via HLS. To present the media, the example media device presents each sequential segment in sequence. Additionally or alternatively, in some disclosed examples the media device uses a media presenter (e.g., a browser plugin, an app, a framework, an application programming interface (API), etc.) to display media received via HLS.

FIG. 1 is a diagram of an example system 100 for measuring exposure to streaming media. The example of FIG. 1 includes a media monitor 165 to monitor media provided by an example media provider 110 via an example network 150 for presentation by a media presenter 162 of an example media device 160. In the example of FIG. 1, an example service provider 120, an example media monitor 165, and an example central facility 170 of an audience measurement entity cooperate to collect media presentation data. While the illustrated example of FIG. 1 discloses an example implementation of the service provider 120, other example implementations of the service provider 120 may additionally or alternatively be used, such as the example implementations disclosed in U.S. patent application Ser. Nos. 13/341,646, 13/341,661, 13/443,596, 13/793,991, 13/445,961, 13/793,974, 13/472,170, 13/767,548, 13/793,959, and 13/778,108, which are hereby incorporated by reference herein in their entirety.

The media provider 110 of the illustrated example of FIG. 1 corresponds to any one or more media provider(s) capable of providing media for presentation at the media device 160. The media provided by the media provider(s) 110 can be any type of media, such as audio, video, multimedia, etc. Additionally or alternatively, the media can correspond to live (e.g., broadcast) media, stored media (e.g., on-demand content), etc.

The service provider 120 of the illustrated example of FIG. 1 provides media services to the media device 160 via, for example, web pages including links (e.g., hyperlinks, embedded media, etc.) to media provided by the media provider 110. In some examples, the service provider 120 is implemented by a server (i.e., a service provider server) operated by an entity providing media services (e.g., an Internet service provider, a television provider, etc.). In the illustrated example, the service provider 120 processes the media provided by the media provider 110 prior to transmitting the media to the media device 160. In the illustrated example, the service provider 120 includes an example transcoder 122, an example media identifier 125, an example media transmitter 140, an example metadata reference data store 142, and an example metadata request servicer.

In the illustrated example, the example transcoder 122 employs any appropriate technique(s) to transcode and/or otherwise process the media received from the media provider 110 into a form suitable for streaming (e.g., a streaming format). For example, the transcoder 122 of the illustrated example transcodes the media in accordance with MPEG 4 audio/video compression for use via the HLS protocol. However, any other format may additionally or alternatively be used. In examples disclosed herein, the transcoder 122 transcodes the media into a binary format for transmission to the media device 160. To prepare the media for streaming, in some examples, the transcoder 122 segments the media into smaller portions implemented by MPEG4 files. For example, a thirty second piece of media may be broken into ten segments (MPEG4 files), each being three seconds in length.

The example media identifier 125 of FIG. 1 extracts media identifying data (e.g., signatures, watermarks, etc.) from the media (e.g., from the transcoded media). The media identifier 125 of the illustrated example implements functionality provided by a software development kit (SDK) provided by the Audience Measurement Entity associated with the central facility 170 to extract one or more audio watermarks, one or more video (e.g., image) watermarks, etc., embedded in the audio and/or video of the media. For example, the media may include pulse code modulation (PCM) audio data or other types of audio data, uncompressed video/image data, etc. In the illustrated example, the example media identifier 125 scans the media to identify and/or extract the media identifying data. For example, throughout the media (and/or a segment of the media), various media identifying data (e.g., codes, signatures, etc.) may be used. In some examples, rather than processing the transcoded media, the media identifier 125 processes the media received from the media provider 110 (e.g., prior to and/or in parallel with transcoding).

The example media identifier 125 of FIG. 1 determines (e.g., derives, decodes, converts, etc.) the media identifying data (e.g., such as media identifying metadata, source identifying information, etc.) included in or identified by a watermark embedded in the media and converts this media identifying data into a format for insertion in an ID3 tag and/or other metadata format. In some examples, the watermark itself is included in the ID3 tag (e.g., without undergoing any modification). In some examples, the metadata is not included in the watermark embedded in the media but, rather, is derived based on a look-up of data based on the watermark. For example, the example media identifier 125 may query a lookup table (e.g., a lookup table stored at the service provider 120, a lookup table stored at the central facility 170, etc.) to determine the metadata to be packaged with the media.

The example media identifier 125 of FIG. 1 determines a source URL at which the media (and/or media segment) is to be hosted. While detecting media identifying data throughout the media, the example media identifier 125 determines a time within the media at which the corresponding media identifying data was detected. The time within the media at which the media identifying data was detected and the source URL are stored in association with each other and in further association with the determined metadata in the metadata reference data store 142. The source URL and time within the media may later be used to look up the metadata associated with the media.

The media transmitter 140 of the illustrated example of FIG. 1 employs any appropriate technique(s) to select and/or stream the media segments to a requesting device, such as the media device 160. For example, the media transmitter 140 of the illustrated example selects one or more media segments in response to a request for the one or more segments by the media device 160. The media transmitter 140 then streams the media to the media device 160 via the network 150 using HLS or any other streaming protocol. In some examples, when transmitting the media to the media device 160, the media transmitter 140 includes instructions for determining a source URL of the media, and a time within the media (e.g., a current playback time). The instructions may further cause the media device 160 to request metadata associated with the source URL and time from the metadata request servicer 144. The instructions may be located within a webpage transmitted to the media device 160. Moreover, the instructions may be transmitted in a separate instruction document transmitted in association with the webpage to the media device 160.

In some examples, the media identifier 125 and/or the transcoder 122 prepare media for streaming regardless of whether (e.g., prior to) a request is received from the client device 160. In such examples, the already-prepared media is stored in a data store of the service provider 120 (e.g., such as in a flash memory, magnetic media, optical media, etc.). In such examples, the media transmitter 140 prepares a transport stream for streaming the already-prepared media to the client device 160 when a request is received from the client device 160. In other examples, the media identifier 125 and/or the transcoder 122 prepare the media for streaming in response to a request received from the client device 160.

The example metadata reference data store 142 may be any device for storing data such as, for example, flash memory, magnetic media, optical media, etc. Furthermore, the data stored in the example metadata reference data store 142 may be in any data format such as, for example, binary data, comma delimited data, tab delimited data, structured query language (SQL) structures, etc. While in the illustrated example the metadata reference data store 142 is illustrated as a single database, the metadata reference data store 142 may be implemented by multiple databases.

The example metadata request servicer 144 receives requests for metadata. In examples disclosed herein, the requests for metadata which requests include a source URL of media corresponding to the metadata being requested, a time within the media (e.g., a current playback position of the media), and, in some examples, user and/or device identifying information. User and/or device identifying information may be included in examples when, for example, the example metadata request servicer 144 is to relay the requested metadata and the user and/or device identifying information to the central facility 170, rather than transmitting the metadata to the requesting media device. The example metadata request servicer 144 performs a lookup within the metadata reference data store 142 based on the source URL and the time within the media to determine metadata that is associated with the media. In the illustrated example, the example metadata request servicer 144 responds to the request by transmitting the requested metadata to the requesting device (e.g., to the media device 160 of FIG. 1).

The example network 150 of the illustrated example is the Internet. Additionally or alternatively, any other network(s) communicatively linking the service provider 120 and the client device such as, for example, a private network, a local area network (LAN), a virtual private network (VPN), etc. may be used. The network 150 may comprise any number of public and/or private networks using any type(s) of networking protocol(s).

The media device 160 of the illustrated example of FIG. 1 is a computing device that is capable of presenting streaming media provided by the media transmitter 140 via the network 150. The media device 160 may be, for example, a tablet, a desktop computer, a laptop computer, a mobile computing device, a television, a smart phone, a mobile phone, an Apple® iPad®, an Apple® iPhone®, an Apple® iPod®, an Android™ powered computing device, a Palm® webOS® computing device, etc. In the illustrated example, the media device 160 includes a media presenter 162 and a media monitor 165. In the illustrated example, the media presenter 162 is implemented by a media player (e.g., Apple QuickTime, a browser plugin, a local application, etc.) that presents streaming media provided by the media transmitter 140 using any past, present, or future streaming protocol(s). For example, the example media presenter 162 may additionally or alternatively be implemented in Adobe® Flash® (e.g., provided in a SWF file), may be implemented in hypertext markup language (HTML) version 5 (HTML5), may be implemented in Google® Chromium®, may be implemented according to the Open Source Media Framework (OSMF), may be implemented according to a device or operating system provider's media player application programming interface (API), may be implemented on a device or operating system provider's media player framework (e.g., the Apple® iOS® MPMoviePlayer software), etc., or any combination thereof.

In the illustrated example, the media monitor 165 interacts with the media presenter 162 to identify a source URL of the media and a current time (e.g., relative to a start position) of the media (e.g., a current playback position within the media presentation). The media monitor 165 then determines the metadata corresponding to the position of the corresponding media by querying the metadata request servicer 144 with the identified source URL and the identified current time of the media. The example media monitor 165 then relays the metadata received in response to the request and, in some examples, a user and/or device identifier, to the central facility 170. While, for simplicity, in the illustrated example a single media device 160 is illustrated in FIG. 1, in most implementations many media devices 160 will be present. Thus, any number and/or type(s) of media devices may be used.

The central facility 170 of the audience measurement entity of the illustrated example of FIG. 1 includes an interface to receive reported media presentation data (e.g., metadata) from the media monitor 165 of the media device 160 via the network 150. In some examples, the central facility 170 is implemented by a server (i.e., an audience measurement entity server) operated by the audience measurement entity. In examples disclosed herein, the audience measurement entity (AME) is a neutral third party (such as The Nielsen Company (US), LLC) who does not source, create, and/or distribute media and can, thus, provide unbiased ratings and/or other media monitoring statistics. In the illustrated example, the central facility 170 includes an Internet interface 171 to receive HTTP requests that include the media presentation data. Additionally or alternatively, any other method(s) to receive media presentation data may be used such as, for example, an HTTP Secure protocol (HTTPS), a file transfer protocol (FTP), a secure file transfer protocol (SFTP), etc. In the illustrated example, the central facility 170 includes a reporter 172 that stores and analyzes media presentation data received from a plurality of different client devices. For example, the example reporter 172 of the example central facility 170 may sort and/or group media presentation data by media provider 110 (e.g., by grouping all media identifying data associated with a particular media provider 110). Any other processing of media presentation data may additionally or alternatively be performed.

Figure 2:
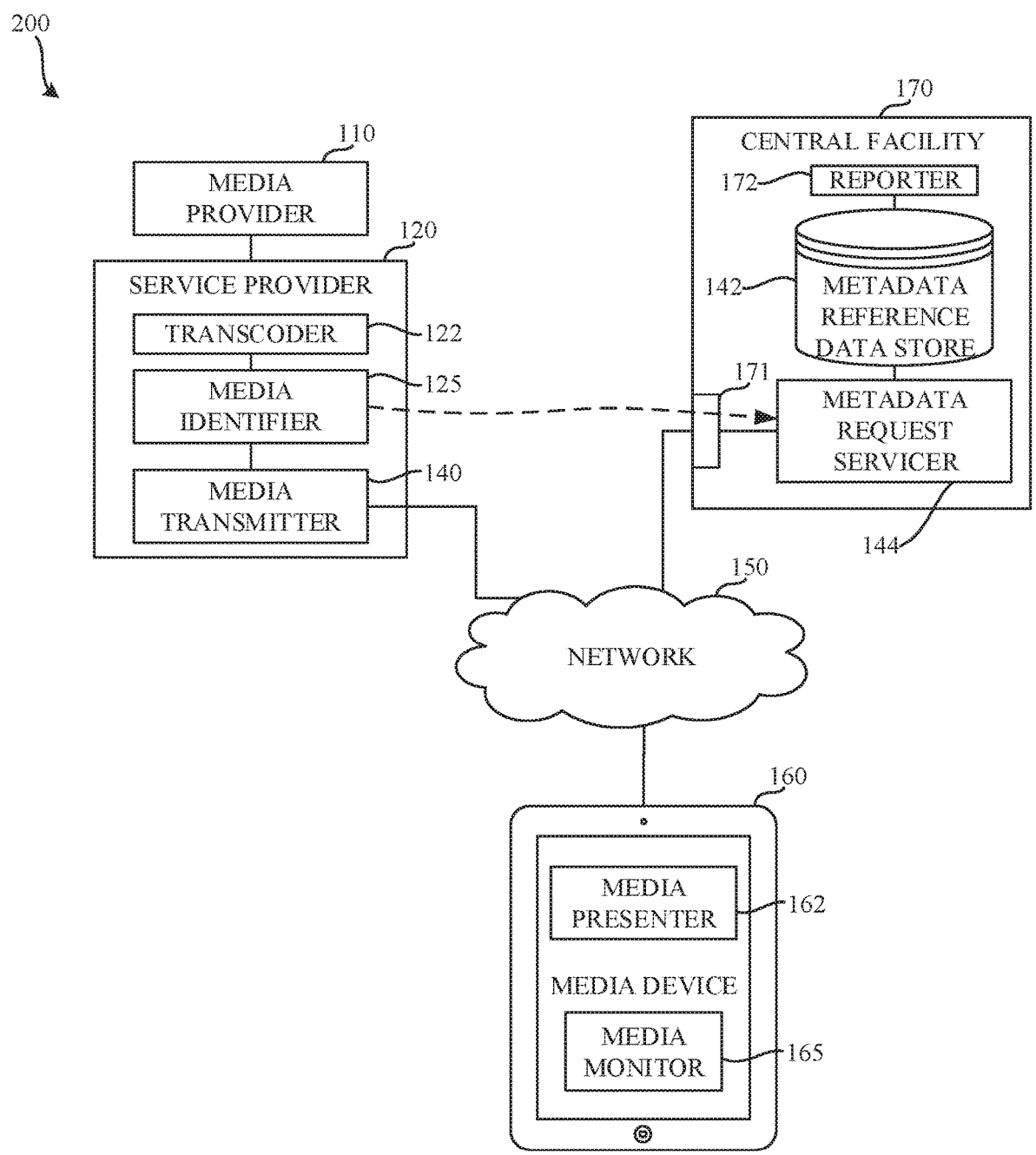
FIG. 2 is a diagram of an alternative example system for measuring exposure to streaming media.

FIG. 2 is a diagram of an alternative example alternate system 200 for measuring exposure to streaming media. In the illustrated example of FIG. 2, the example metadata reference data store 142 and the example metadata request servicer 144 are implemented as part of the central facility 170, rather as part of than the example service provider 120 (as illustrated in FIG. 1). In the illustrated example of FIG. 2, the example media identifier 125 of the service provider 120 transmits the media identifying information, the source URL, and the time within the media to the metadata reference data store 142 at the central facility 170. As a result, the example transmitter 140 of FIG. 2 embeds in and/or otherwise transmits an instruction with the media to cause the media monitor 165 to query the metadata request servicer 144 at the central facility 170 when monitoring the media. In such an example, the metadata request servicer 144, rather than returning metadata to the media monitor 165, may return an acknowledgment message, representing that the source URL, the time within the media, and, in some examples, the user and/or device identifier, has been received by the central facility 170.

The approach shown in the illustrated example of FIG. 2 may be desirable in some circumstances because, for example, the metadata need not be transmitted to the media monitor 165, the user and/or device identifier need not be shared with the service provider 120 (e.g., the service provider need not be involved in subsequent monitoring activities, etc.), etc. Reducing the amount of information that needs to be transmitted to effectuate the media presentation and media monitoring effort reduces bandwidth requirements of, for example, the media device 160.

Figure 3:
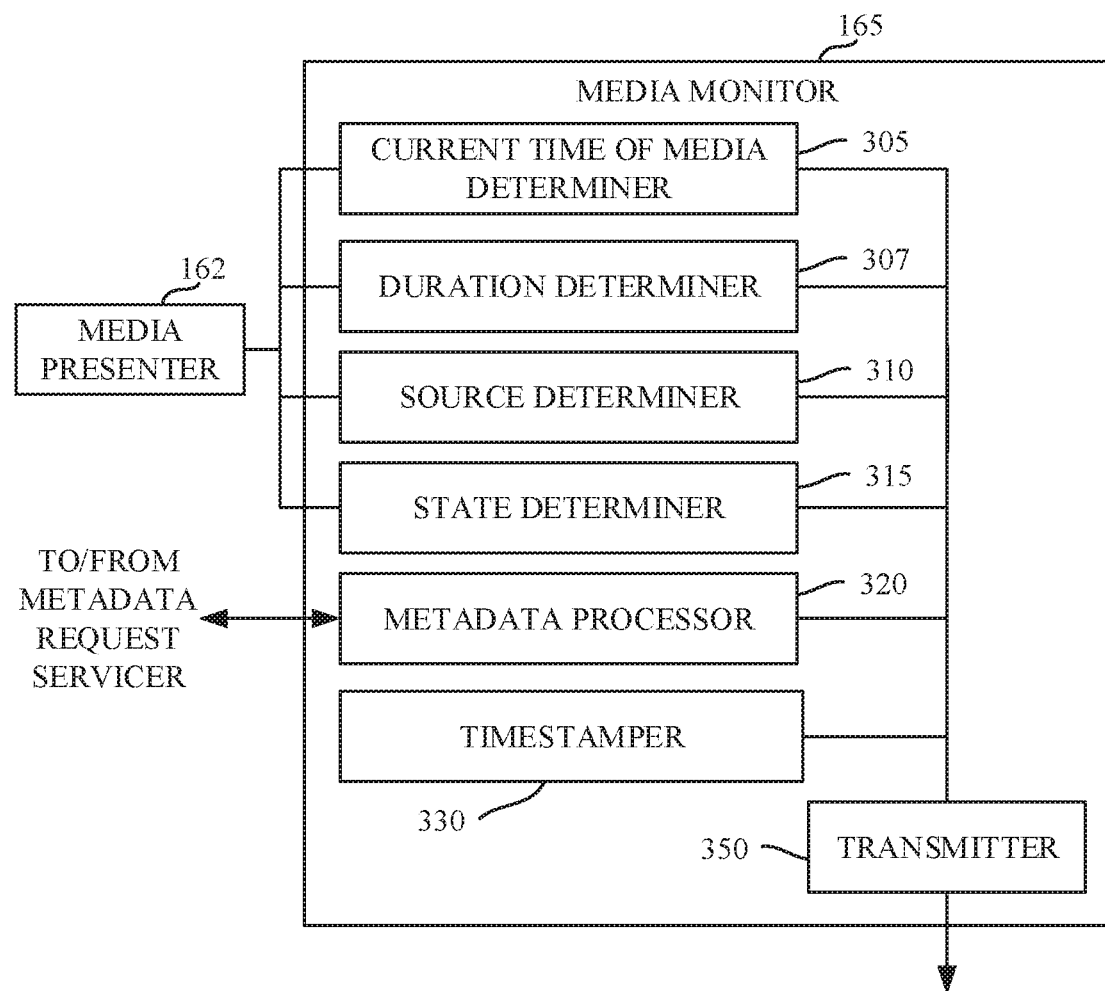
FIG. 3 is a block diagram of an example implementation of the media monitor of FIGS. 1 and/or 2.

FIG. 3 is a block diagram of an example implementation of the media monitor 165 of FIGS. 1 and/or 2. The example media monitor 165 of FIG. 3 includes a current time of media determiner 305, a duration determiner 307, a source determiner 310, a state determiner 315, a metadata processor 320, a timestamper 330, and a transmitter 350.

The example current time of media determiner 305 determines a current time and/or a current position of a media presentation within the media (e.g., a playback position). As used herein, the current time of a media presentation represents a temporal offset (e.g., a time) from a start of the media (e.g., zero seconds, five seconds, ten seconds, etc.). In the illustrated example, the current time is measured in seconds. However, any other measure of time may additionally or alternatively be used, such as, for example, minutes, milliseconds, hours, etc. Moreover, any way of identifying a current time within (e.g., relative to) a media presentation may additionally or alternatively be used, such as, for example, a video frame identifier of the media, etc. In the illustrated example, the example current time of media determiner 305 identifies the current time by interacting with the media presenter 162. In the illustrated example, the current time of media determiner 305 is implemented by a JavaScript instruction that queries the current position of the media presentation from the media presenter 162. In the illustrated example, the JavaScript instruction(s) are transmitted to the media device 160 as part of a webpage that includes an instruction (e.g., a link, a Hypertext Markup Language (HTML) tag, etc.) instructing the media device to display the media. In the illustrated example, the media presenter 162 presents an Application Programming Interface (API) that enables requests for the current time within the media to be serviced. In the illustrated example, the API includes a function which, when called, responds to the example current time of media determiner 305 with the current time within the media. To service the request, the example media presenter 162 determines a time within the media by, for example, detecting a time associated with a currently presented frame of the media. However, any other way of identifying a current time of a media presentation may additionally or alternatively be used.

The example duration determiner 307 of the example of FIG. 3 determines a duration of the media. In the illustrated example, the duration determiner 307 is implemented by a JavaScript instruction which, when executed, queries the media presenter 162 for the duration of the media. In the illustrate example, the JavaScript instruction(s) are transmitted to the media device 160 as part of a webpage that includes an instruction (e.g., a link, a Hypertext Markup Language (HTML) tag, etc.) instructing the media device to display the media. In the illustrated example, the API provided by the media presenter 162 includes a function which, when called, responds to the example duration determiner 407 with the duration of the media currently being presented via the media presenter. To service the request for the duration, the example media presenter 162 determines the duration of the media by, for example, detecting a time associated with a last frame of the media. However, any other approach to identifying a duration of media may additionally or alternatively be used such as, for example, processing a screenshot of the media presenter to identify a duration text (e.g., 5:06, representing media that is five minutes and six seconds in duration).

The example source determiner 310 of the illustrated example of FIG. 3 interacts with the example media presenter 162 to identify a source of the media. In the illustrated example, the source of the media is identified by a universal resource locator (URL). However, the source may additionally or alternatively be identified in any other way (e.g., a name of the service provider 120, a name of the media provider 110, etc.). In the illustrated example, the example source determiner 310 is implemented by a JavaScript instruction which, when executed, queries the media presenter 162 for the source URL. In the illustrated example, the JavaScript instruction(S) are transmitted to the media device 160 as part of a webpage that includes an instruction (e.g., a link, a Hypertext Markup Language (HTML) tag, etc.) instructing the media device to display the media. In the illustrated example, the API provided by the media presenter 162 includes a function which, when called, responds to the example source determiner 310 with the source of the media. To service the request for the source, the example media presenter 162 determines a source of the media by, for example, detecting a source URL from which the media was retrieved. In some examples, rather than interacting with the media presenter 162 (e.g., a QuickTime plugin of a browser), the example source determiner 310 implements JavaScript instructions to read a source of a media element within a webpage (e.g., a source field of a video tag within a hypertext markup language (HTML) webpage). In such an example, the JavaScript instructions may retrieve the source of the media by inspecting a document object model (DOM) object created by the browser when rendering the webpage.

The example state determiner 315 of the illustrated example of FIG. 3 interacts with the example media presenter 162 to identify a state of the media presentation. As described herein, the state of the media presentation represents whether the media presentation is actively being played, whether the media presentation is paused, whether the media presentation has stopped, etc. In the illustrated example, the example state determiner 315 is implemented by a JavaScript instruction which, when executed, queries the media presenter 162 for the state of the media presentation. In the illustrated example, the JavaScript instruction(s) are transmitted to the media device 160 as part of a webpage that includes an instruction (e.g., a link, a Hypertext Markup Language (HTML) tag, etc.) instructing the media device to display the media. In the illustrated example, the API provided by the media presenter 162 includes a function which, when called, responds to the example state determiner 315 with the state of the media presentation. To service the request for the state, the example media presenter 162 determines its current mode of operation (e.g., playing media, paused, fast forwarding, etc.). However, any other approach may additionally or alternatively be used such as, for example, processing an image of the media presenter to, for example, detect a presence of a play icon, a presence of a pause icon, etc. Example systems for identifying a state of a media presentation are disclosed in co-pending U.S. patent application Ser. Nos. 12/100,264 and 12/240,756, which are hereby incorporated by reference in their entirety.

The example metadata processor 320 of the illustrated example of FIG. 3 determines whether media presentation data should be gathered. If media presentation data should be gathered, the example metadata processor 320 instructs the example current time of media determiner 305, the example source determiner 310, the example state determiner 315, and/or the example timestamper 330 to gather the media presentation data. In the illustrated example, the metadata processor 320 operates upon loading of the media (e.g., a webpage) by the media device 160 to collect the media presentation data. Moreover, the metadata processor 320 waits a threshold period of time before gathering subsequent media presentation data. As such, media that is loaded by a media device for presentation to a user, but that has not yet been presented (e.g., the user has not clicked a play button) may be monitored. That is, media that is queued for presentation may be detected regardless of whether it has been presented. In examples where media has not yet begin presentation, the current time of the media may be identified as zero seconds.

Some other known systems monitor media presentation events (e.g., a user presses the start button, a frame of a video is advanced, the user presses the pause button, etc.) The approach disclosed herein of collecting media presentation data upon loading of the media is beneficial over such known systems because the approach disclosed herein enables detection of media that is not yet presented, as compared to detecting media only after the presentation begins (e.g., during presentation). This is useful because, for example, it enables monitoring of media that was available for presentation to a user, but which the user does not select for presentation. This provides insights into user choices.

The example metadata processor 320 of the illustrated example transmits the current time of media detected by the current time of media determiner 305 and the source URL identified by the source determiner 310 to the metadata request servicer 144 of FIGS. 1 and/or 2. In response, the example metadata processor 320 receives metadata associated with the presented media. The metadata, once received is forwarded to the central facility 170 via the transmitter 350. In some examples, the example metadata processor 320 identifies user and/or device identifying information by, for example, performing a lookup of the user and/or device identifying information (e.g., from a local memory, from a browser cache, from a cache of the media presenter, etc.). The user and/or device identifying information is provided to the transmitter 350 for transmission to the central facility 170.

The example timestamper 330 of the illustrated example of FIG. 3 generates a timestamp indicative of a date and/or time that the media presentation data was gathered. Timestamping (e.g., determining a time that an event occurred) enables accurate identification and/or correlation of media that was presented and/or the time that it was presented to the user(s) present near and/or operating the media device. In the illustrated example, the timestamper 330 determines the date and/or time using a clock of the media device 160. However, in some examples, the timestamper 330 determines the data and/or time by requesting the date and/or time from an external time source, such as a National Institute of Standards and Technology (NIST) Internet Time Service (ITS) server. However, any other approach to determining a timestamp may additionally or alternatively be used.

The example transmitter 350 of the illustrated example of FIG. 3 transmits the media presentation data to the central facility via, for example, the Internet. As noted above, the media presentation data includes information concerning the presentation of the media including, for example, a current time of presentation within the media, a duration of the media, a source of the media (e.g., a universal resource locator (URL) of a service provider, a name of a service provider, a channel, etc.), metadata of the media presenter, a timestamp, a user and/or device identifier, etc.

In the illustrated example, the media presentation data is transmitted to the central facility using a Hypertext Transfer Protocol (HTTP) Post request. However, any other method of transmitting data and/or metadata may additionally or alternatively be used. Because, in the illustrated example, an HTTP message is used, the transmitter 350 may include cookie data that identifies a user and/or a device that is transmitting the media presentation data (assuming the transmission is to an Internet domain that has set such a cookie). In some examples, the user and/or device identifier is transmitted as part of an HTTP header, while other media presentation data (e.g., a duration of the media, metadata, a timestamp, etc.) are transmitted in a payload of the HTTP message. Because the user and/or device identifier is included in the HTTP message, the central facility 170 can identify the user and/or the device as associated with the media presentation. In some examples, the users are panelists and the cookie data that includes the user and/or device identifier is set by the central facility 170 to enable instances of monitored media presentation data to be associated with the panelist. However, in some other examples, the users are not panelists and the demographic information is determined via other approaches, such as those described in Mazumdar, U.S. Pat. No. 8,370,489, which is hereby incorporated by reference in its entirety.

While in the illustrated example the example HTTP message is used to convey the media presentation data to the central facility 170, any other approach to transmitting data may additionally or alternatively be used such as, for example, a file transfer protocol (FTP), an HTTP Get request, Asynchronous JavaScript and extensible markup language (XML) (AJAX), etc. In some examples, the media presentation data is not transmitted to the central facility 170. Additionally or alternatively, the media presentation data may be transmitted to a display object of the media device 160 for display to a user. In the illustrated example, the media presentation data is transmitted in near real-time (e.g., streamed) to the central facility 170. As used herein, near real-time is defined to be transmission of data (e.g., the media presentation data) within a short time duration (e.g., one minute) of the identification, generation, and/or detection of the data. However, in some examples, the media presentation data may be stored (e.g., cached, buffered, etc.) for a period of time before being transmitted to the central facility 170.

FIG. 4 is an example data table 400 that may be used to store metadata (e.g., media identifying data) in association with a source universal resource locator (URL) and a time within media. The example data table 400 includes a source URL column 410, a time within media column 420, and a metadata column 430. The example data table 400 of FIG. 4 includes a first row 450, a second row 460, and a third row 470. The example source URL column 410 represents a source URL at which the media is to be accessed. In the illustrated example, the example source URL column 410 includes URLs of the service provider 120. However, the URLs of the example source URL column 410 may identify any other location such as, for example a location of the media provider 110. Moreover, while the source URL column 410 uses URLs to identify the network location from which the media may be accessed, any other identifier may be used to identify the media.

The example time within media column 420 represents various times within the media identified by the data in the example source URL column 410 of the illustrated example. In the illustrated example, the example time within media column 420 is implemented using hours, minutes, and seconds. However, any other notation of time may additionally or alternatively be used.

The example metadata column 430 represents metadata identified by the media identifier 125 of FIGS. 1 and/or 2. In the illustrated example of FIG. 4, the example metadata is represented as an ID3 tag. However, any other metadata format may additionally or alternatively be used.

The first row 450 of the example table of FIG. 4 identifies that a source of the media is "SERVICE_PROVIDER.COM/MEDIA1.MPG", and that the time within the media with which the metadata is associated is ten seconds (i.e., ten seconds from the start of the media). The second row 460 of the example table of FIG. 4 identifies the same source of the media as the first example row 450 ("SERVICE_PROVIDER.COM/MEDIA1.MPG"). However, the time within the media of the second example row 460 is different from the first example row 450 (i.e., twenty seconds). In the illustrated example of FIG. 4, the second example row 460 includes different metadata (i.e., ID3 metadata 002) than the metadata (i.e., ID3 metadata 001) of the first example row 450 because it is associated with, for example, content, event(s), actor(s), or the like occurring at a different time within the media. However, in some examples, the metadata may be the same because, for example, it is associated with the same source URL.

The third row 470 of the example table of FIG. 4 identifies different source media than the first row 450 and the second row 460. In the illustrated example, the third row 470 identifies a source of "SERVICE_PROVIDER.COM/MEDIA2.MPG", and a time within the media of ten seconds (i.e., ten seconds from the start of the media). The third row 470 of this example includes metadata in the example metadata column 430 (i.e., ID3 metadata 010) that is different from the metadata present in the first row 450 and the second row 460 because different media is identified. However, in some examples, the same media may be hosted at two different URLs and, in some such examples, the two different URLs may correlate to the same metadata.

In some examples, the metadata includes a source identifier that identifies the service provider 120 and/or the media provider 110. Including a source identifier in the metadata enables the central facility 170 to later identify usage of various service providers and/or media providers. For example, the central facility 170 may identify that a particular demographic is more likely to use a first provider than a second service provider, even though the users are viewing the same media.

While an example manner of implementing the example service provider 120 is illustrated in FIGS. 1 and/or 2, an example manner of implementing the example central facility 170 is illustrated in FIGS. 1 and/or 2, and an example manner of implementing the example media monitor 165 of FIGS. 1 and/or 2 is illustrated in FIG. 3, one or more of the elements, processes and/or devices illustrated in FIGS. 1, 2, and/or 3 may be combined, divided, re-arranged, omitted, eliminated and/or implemented in any other way. Further, the example transcoder 122, the example media identifier 125, the example media transmitter 140, the example metadata reference data store 142, the example metadata request servicer 144 and/or, more generally, the example service provider 120 of FIG. 1, the example current time of media determiner 305, the example duration determiner 307, the example source determiner 310, the example state determiner 315, the example metadata processor 320, the example timestamper 330, the example transmitter 350, and/or, more generally, the example media monitor 165 of FIGS. 1 and/or 3, and/or the example Internet interface 171, the example reporter 172, the example metadata reference data store 142, the example metadata request servicer 144, and/or, more generally, the example central facility 170 of FIGS. 1 and/or 2 may be implemented by hardware, software, firmware and/or any combination of hardware, software and/or firmware. Thus, for example, any of the example transcoder 122, the example media identifier 125, the example media transmitter 140, the example metadata reference data store 142, the example metadata request servicer 144 and/or, more generally, the example service provider 120 of FIG. 1, the example current time of media determiner 305, the example duration determiner 307, the example source determiner 310, the example state determiner 315, the example metadata processor 320, the example timestamper 330, the example transmitter 350, and/or, more generally, the example media monitor 165 of FIGS. 1 and/or 3, and/or the example Internet interface 171, the example reporter 172, the example metadata reference data store 142, the example metadata request servicer 144, and/or, more generally, the example central facility 170 of FIGS. 1 and/or 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example transcoder 122, the example media identifier 125, the example media transmitter 140, the example metadata reference data store 142, the example metadata request servicer 144 and/or, more generally, the example service provider 120 of FIG. 1, the example current time of media determiner 305, the example duration determiner 307, the example source determiner 310, the example state determiner 315, the example metadata processor 320, the example timestamper 330, the example transmitter 350, and/or, more generally, the example media monitor 165 of FIGS. 1 and/or 3, and/or the example Internet interface 171, the example reporter 172, the example metadata reference data store 142, the example metadata request servicer 144, and/or, more generally, the example central facility 170 of FIGS. 1 and/or 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example service provider 120 of FIGS. 1 and/or 2, the example central facility 170 of FIGS. 1 and/or 2, and/or the example media monitor 165 of FIGS. 1, 2, and/or 3 may include one or more elements, processes and/or devices in addition to, or instead of, those illustrated in FIGS. 1, 2, and/or 3, and/or may include more than one of any or all of the illustrated elements, processes and devices.

Figure 6:
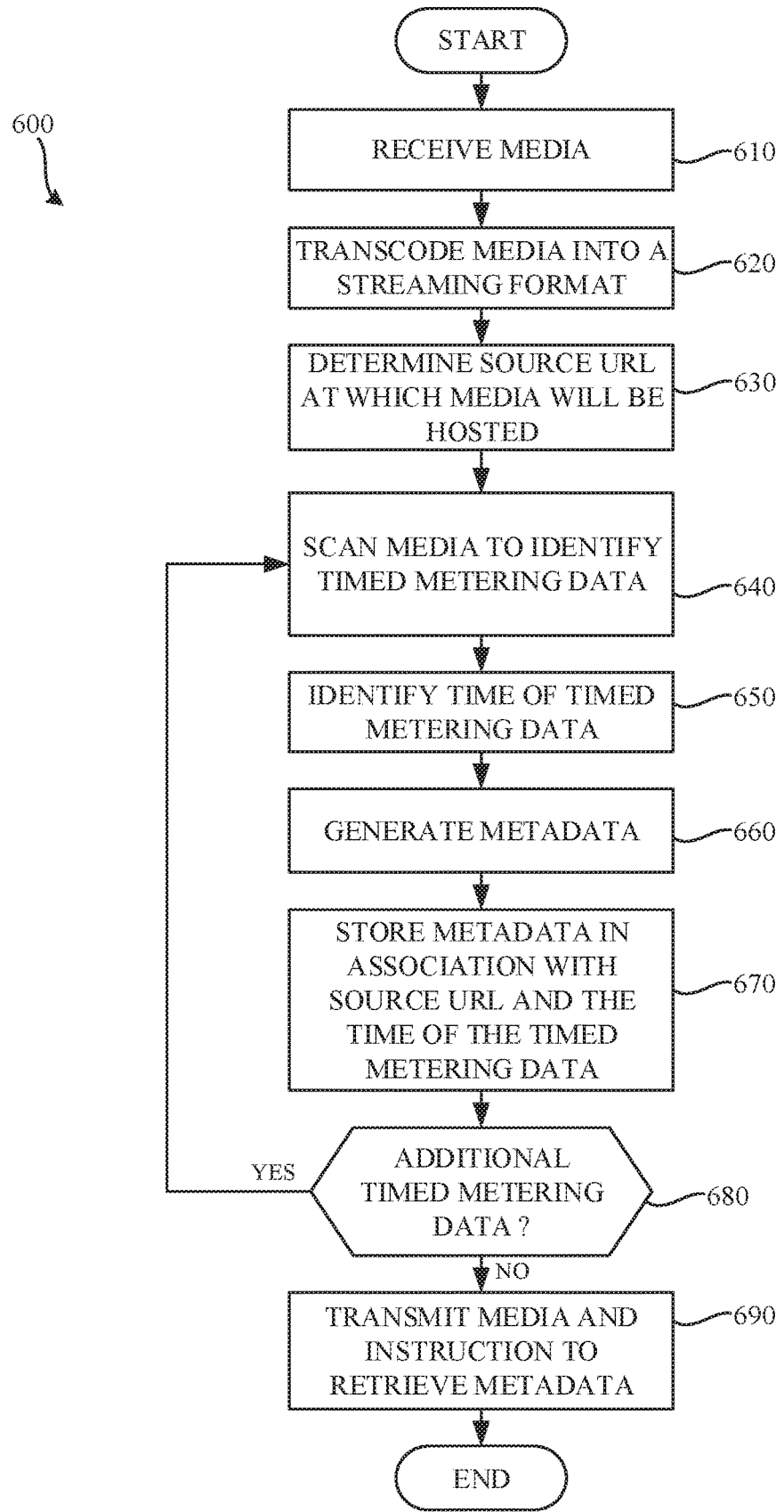
FIG. 6 is a flowchart representative of example machine-readable instructions which may be executed to implement the example service provider of FIGS. 1 and/or 2.
Figure 7:
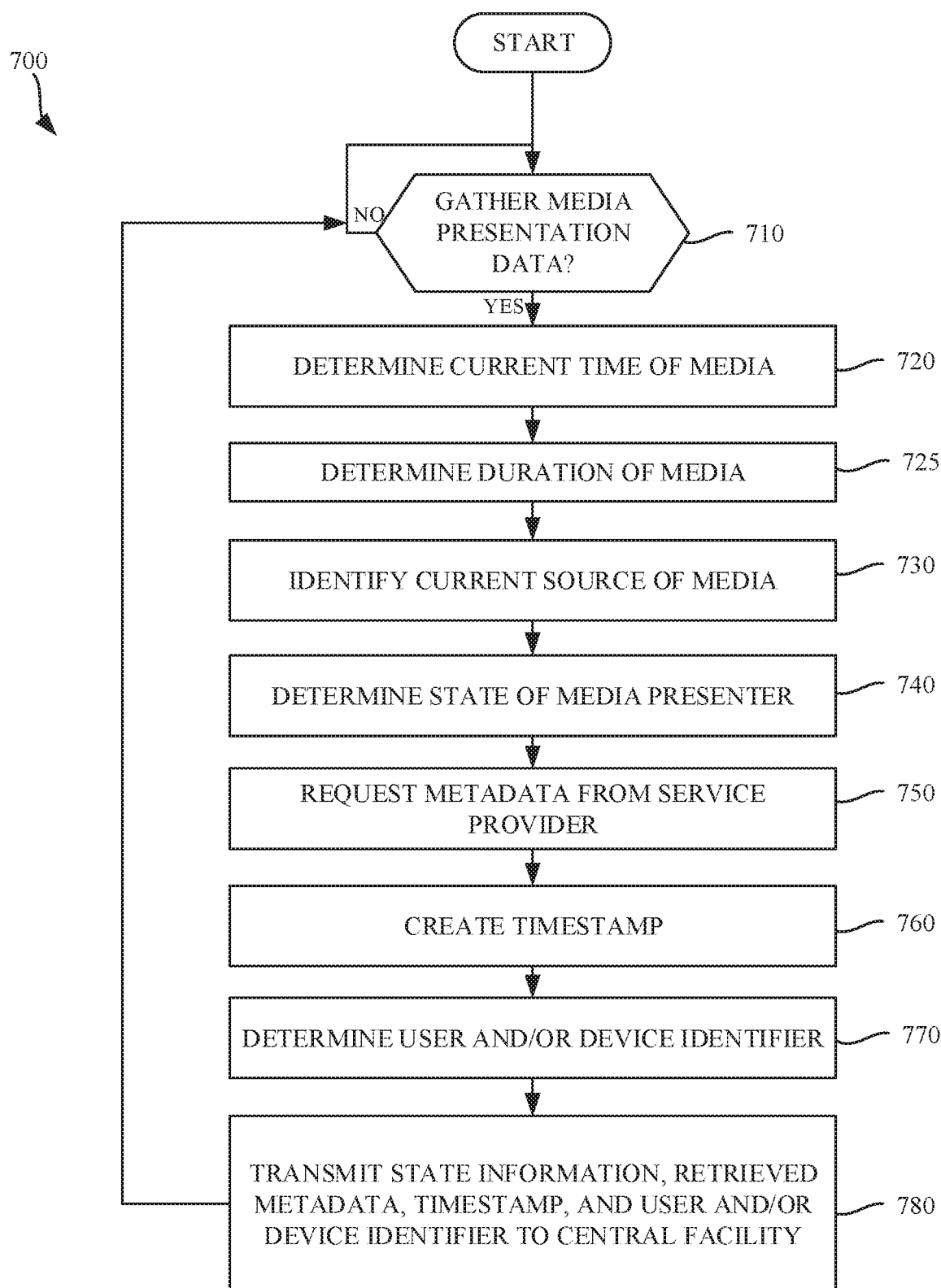
FIG. 7 is a flowchart representative of example machine-readable instructions which may be executed to implement the example media monitor of FIGS. 1, 2, and/or 3.
Figure 8:
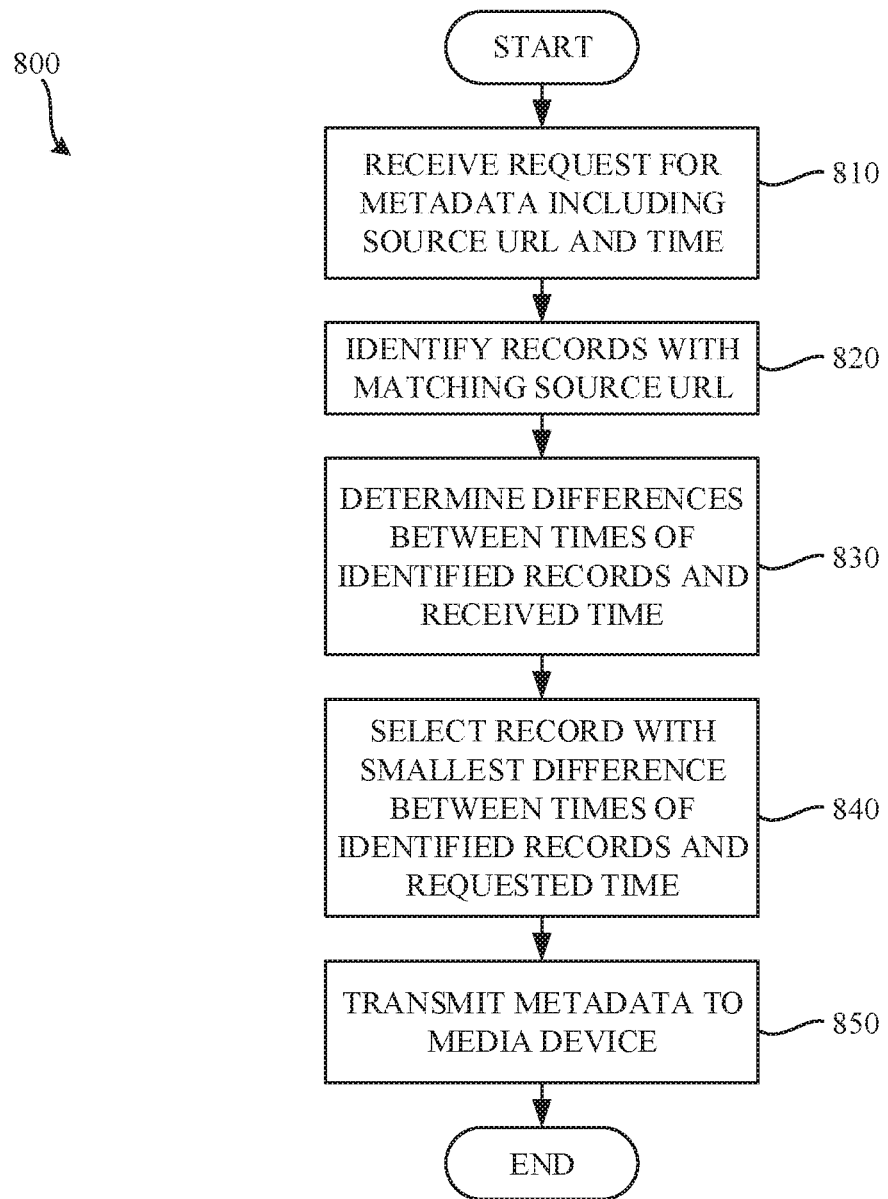
FIG. 8 is a flowchart representative of example machine-readable instructions which may be executed to implement the example service provider of FIGS. 1 and/or 2 to provide metadata to the example media monitor of FIGS. 1, 2, and/or 3.
Figure 10:
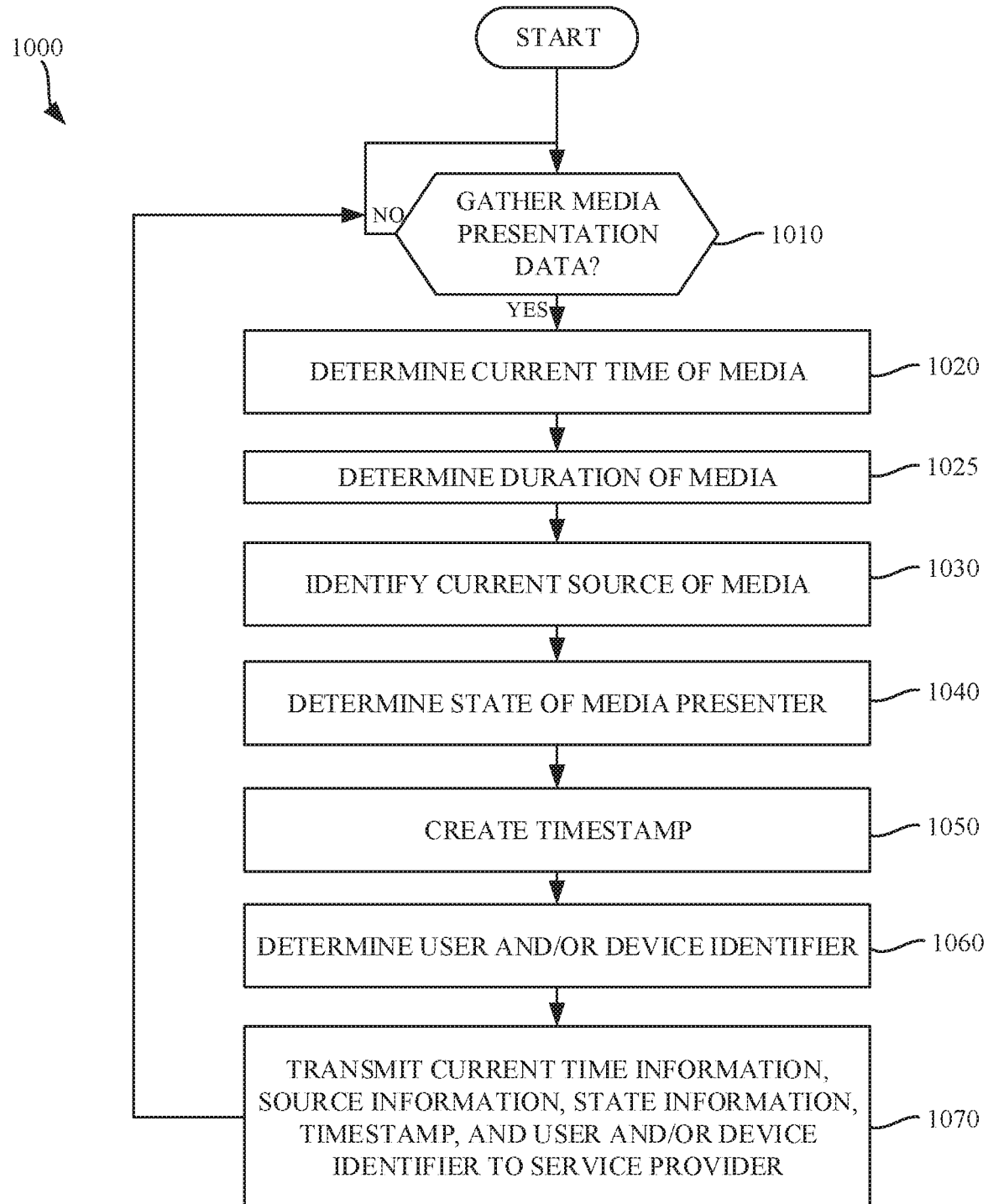
FIG. 10 is a flowchart representative of example machine-readable instructions which may be executed to implement the example media monitor of FIGS. 1, 2, and/or 3.
Figure 11:
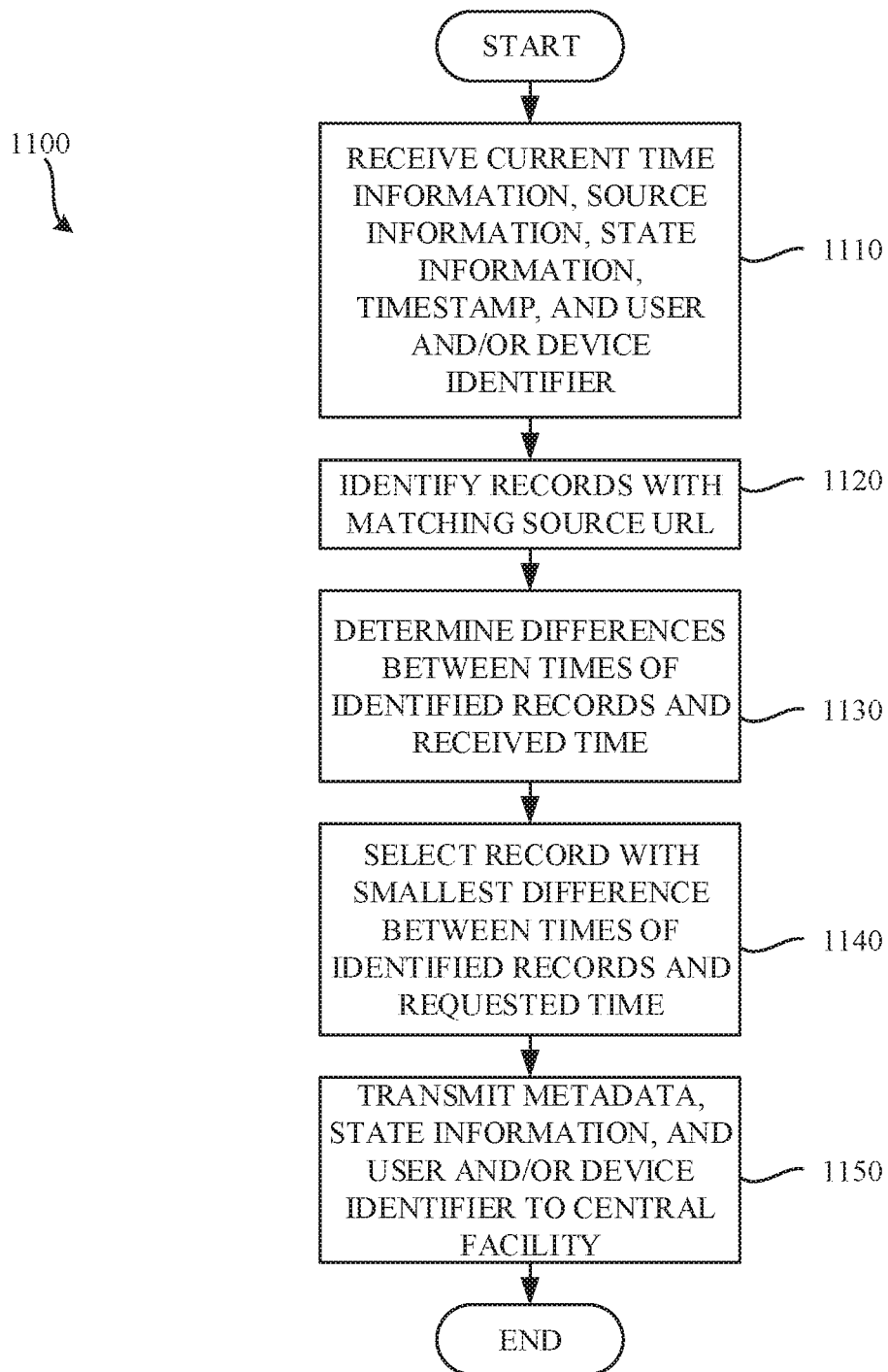
FIG. 11 is a flowchart representative of example machine-readable instructions which may be executed to implement the example service provider of FIGS. 1 and/or 2.
Figure 15:
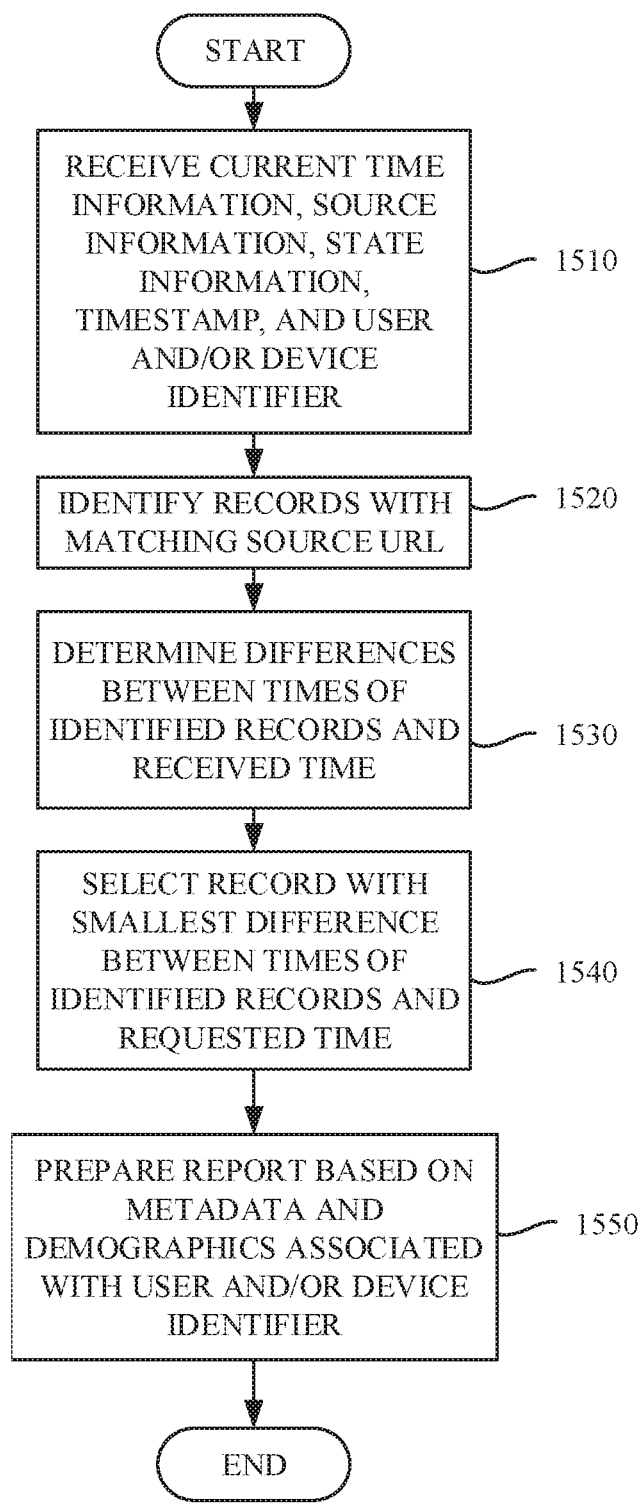
FIG. 15 is a flowchart representative of example machine-readable instructions which may be executed to implement the example central facility of FIGS. 1 and/or 2.

Flowcharts representative of example machine readable instructions for implementing the example service provider 120 of FIGS. 1 and/or 2 are shown in FIGS. 6, 8, 11, and/or 13. Flowcharts representative of example machine readable instructions for implementing the example media monitor 165 of FIGS. 1, 2, and/or 3 are shown in FIGS. 7, 10, and/or 14. A flowchart representative of example machine readable instructions for implementing the example central facility 170 of FIGS. 1 and/or 2 is shown in FIG. 15. In these examples, the machine readable instructions comprise a program(s) for execution by a processor such as the processors 1612, 1712, 1812 shown in the examples discussed below in connection with FIGS. 16, 17, and/or 18. The program(s) may be embodied in software stored on a tangible computer readable storage medium such as a CD-ROM, a floppy disk, a hard drive, a digital versatile disk (DVD), a Blu-ray disk, or a memory associated with the processor 1612, 1712, 1812, but the entire program and/or parts thereof could alternatively be executed by a device other than the processor 1612, 1712, 1812 and/or embodied in firmware or dedicated hardware. Further, although the example program is described with reference to the flowchart illustrated in FIGS. 16, 17, and/or 18, many other methods of implementing the example service provider 120, the example central facility 170, and/or the example media monitor 165 may alternatively be used. For example, the order of execution of the blocks may be changed, and/or some of the blocks described may be changed, eliminated, or combined.

As mentioned above, the example processes of FIGS. 6, 7, 8, 10, 11, 13, 14, and/or 15 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 6, 7, 8, 10, 11, 13, 14, and/or 15 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 5:
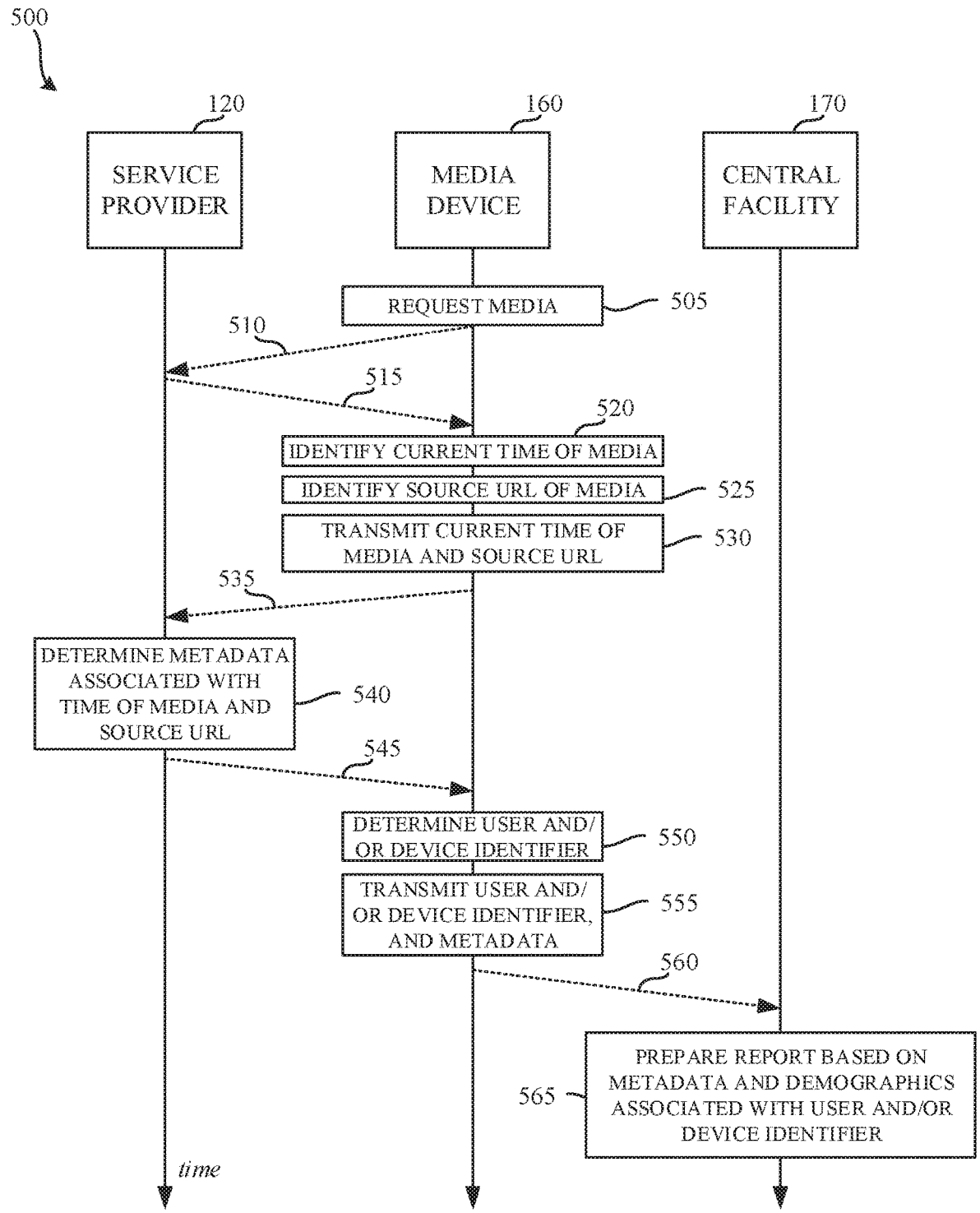
FIG. 5 is an example communication diagram representing interactions between the example service provider, the example media monitor, and/or the example central facility of FIGS. 1, 2, and/or 3.

FIG. 5 is an example communication diagram 500 representing interactions between the example service provider 120, the example media device 160, and/or the example central facility 170 of FIGS. 1, 2, and/or 3. The vertical axis of the example communication diagram 500 represents time. The example communication diagram 500 of the example of FIG. 5 begins when the example media presenter 162 of the media device 160 requests media for presentation based on an instruction in a webpage. (block 505). The example request 510 is transmitted to the service provider 120 (line 510). The service provider 120 responds (line 515) with the requested media. In the illustrated example, the webpage was previously provided by the service provider 120 and includes monitoring instructions for monitoring the media presentation. In the illustrated example, the monitoring instructions implement the example media monitor 165. In some examples, the monitoring instructions are transmitted to the media device when a user signs up to become a panelist and/or installs an application (e.g., an "app") provided by the service provider. However, in some examples, the monitoring instructions are transmitted to the media device as part of the webpage that causes the media device to request the media, such as those instructions described in Blumenau, U.S. Pat. No. 6,108,637, which is incorporated by reference herein.

The example media monitor 165 of the media device 160 of this example executes the monitoring instructions (e.g., JavaScript instructions) to identify a current time of the media (block 520) and identify a source URL of the media (block 525). In some examples the media monitor 165 executes the monitoring instructions in accordance with the teachings of Blumenau, U.S. Pat. No. 6,108,637. The media monitor 165 transmits the identified current time of the media and the identified source URL to the service provider 120 (block 530) via an HTTP request (line 535). Based on the information received with the request 535, the example request servicer 144 of the service provider 120 determines metadata associated with the time of the media and the source URL (block 540). An example process for determining the metadata is further described in connection with FIG. 8. The example request servicer 144 responds to the request 535 by providing the determined metadata to the media monitor 165 (line 545). The example media monitor 165 determines a user and/or device identifier (block 550) by performing a lookup of the user and/or device identifying information (e.g., from a local memory, from a browser cache, from a cache of the media presenter, etc.), and transmits the user and/or device identifier and the received metadata (block 555) to the central facility 170 (line 560). The example reporter 172 of the central facility 170 then prepares a report based on the received metadata and demographic information associated with the user and/or device identifier. Although only one media device 160 is shown in FIG. 5 for simplicity of explanation, it is expected that most example implementations will have many (e.g., hundreds, thousands, millions, etc.) of devices. Thus, the central facility 170 will receive data from many media devices 160 following the communication pattern shown in FIG. 5. Similarly, although only one service provider 120 is shown in FIG. 5 to simplify the explanation, multiple service providers will be present in many implementations. Moreover, although only one central facility 170 is shown in FIG. 5, many facilities may be provided for collecting the data. In some examples, these data collection facilities are structured in a tiered approach with many satellite collection facilities collecting data and forwarding the same to one or more central facilities 170.

In some examples, the users are panelists and the demographic information associated with the panelists is known by the central facility 170. However, in some other examples, the users are not panelists and the demographic information is determined via other approaches, such as those described in Mazumdar, U.S. Pat. No. 8,370,489, which is hereby incorporated by reference in its entirety.

FIG. 6 is a flowchart representative of example machine-readable instructions which may be executed to implement the example service provider 120 of FIGS. 1 and/or 2. Execution of the example machine-readable instructions 600 of FIG. 6 begins when the example transcoder 122 of the service provider 120 receives the media from the media provider 110 (block 610). In the illustrated example, the media is received as it is broadcast (e.g., live). However, in some examples, the media is stored and/or cached by the transcoder 122. The media is then transcoded by the transcoder 122 of the service provider 120 (block 620). In the illustrated example, the media is transcoded into a streaming format (e.g., an MPEG4 transport stream) that may be transmitted via HTTP live streaming (HLS).

The media identifier 125 of the illustrated example then determines a source URL at which the media will be hosted. (block 630). The example media identifier 125 then scans the media to identify timed media identifying data (block 640). In some examples, media identifying data (e.g., codes, signatures, etc.) changes throughout a media presentation. For example, first media identifying data used during a first portion of media may be different from second media identifying data used during a second portion of the media. Using different media identifying data at different times enables differentiation between different segments of the media, resulting in a finer grained report as to what users were presented with which parts of the media. Such metadata may be tied to the position of the media, a distribution source of the media, and/or a content of the media (e.g., identifying advertisements, intentionally placed products, actors, events etc.) The example media identifier 125 starts at the beginning of the media and proceeds through the media attempting to identify media identifying data. (block 640). Once identified, the example media identifier identifies a time of the timed media identifying data. (block 650).

In the illustrated example, the example media identifier 125 operates on the transcoded media. However, in some examples, the example media identifier 125 operates on the media prior to transcoding. The media identifier 125 of the illustrated example identifies the media by extracting media identifying data (e.g., signatures, watermarks, etc.) from the media. Based on the extracted media identifying data, the media identifier 125 generates metadata (block 660). In the illustrated example, the metadata is generated using an ID3 format. However, any other metadata format may additionally or alternatively be used. Further, in the illustrated example, the metadata is generated by converting the extracted media identifying data to text or other characters. However, in some examples, the metadata may be generated by querying an external source using some or all of the extracted media identifying data and using the metadata returned from the external source as the metadata.

The example media identifier 125 stores the metadata in association with the source URL of the media and the time of the identified timed media identifying data. (block 670). In the illustrated example of FIG. 6, the metadata, source URL, and time are stored in the metadata reference data store 142 of the service provider 120. The example media identifier 125 proceeds to determine if additional timed media identifying data is present in the media. (block 680). If additional media identifying data is present in the media, the example media identifier continues to scan the media to identify the media identifying data. (block 640). If no additional media identifying data is present (block 680), the media is transmitted to a requesting device. In some examples, the media transmission begins before the scanning is complete (e.g., a first, already scanned part of the media is transmitted while a second part of the same media is scanned.)

As noted above, the media is transmitted by the media transmitter 140 of the service provider 120 (block 690). In the illustrated example, an instruction to retrieve the metadata upon presentation of the media is additionally transmitted. In the illustrated example, the media is transmitted using HTTP live streaming (HLS). However, any other format and/or protocol for transmitting (e.g., broadcasting, unicasting, multicasting, etc.) media may additionally or alternatively be used.

FIG. 7 is a flowchart representative of example machine-readable instructions which may be executed to implement the example media monitor of FIGS. 1, 2, and/or 3. The example program 700 of the illustrated example of FIG. 7 begins when the example metadata processor 320 determines whether media presentation data should be gathered. (block 710). In the illustrated example, the example metadata processor 320 determines that media presentation data should be gathered when, for example, a webpage is presented to a user (e.g., upon loading the webpage). However, any other approach to determining whether media presentation data should be gathered may additionally or alternatively be used. For example, the example metadata processor 320 may set a threshold timer to gather media presentation data periodically. Additionally or alternatively, an aperiodic approach may be taken, where the example metadata processor 320 detects media presentation events (e.g., media is loaded for presentation, a user presses a play button, a frame of a video is advanced, etc.) If media presentation data is not to be gathered (block 710), the metadata processor 320 continues to determine whether media presentation data should be gathered (block 710).

If media presentation data is to be gathered (block 710) the example current time of media determiner 305 determines a current time of the media (e.g., a playback time) (block 720). The example current time of media determiner 305 determines the current time within the media by interacting with the media presenter 162. In the illustrated example, the current time of media determiner 305 is implemented by a JavaScript instruction that queries the current playback position from the media presenter 162. However, any other way of identifying a current position of playback within media may additionally or alternatively be used.

The example duration determiner 307 of the illustrated example determines a duration of the media. (block 725) In the illustrated example, the duration determiner 307 determines the duration by querying the media presenter 162 for the duration of the media. However, any other approach to identifying a duration of media may additionally or alternatively be used such as, for example, processing a screenshot of the media presenter to identify a duration text (e.g., 5:06, representing media that is five minutes and six seconds in duration).

The example source determiner 310 of the illustrated example interacts with the example media presenter 162 to identify a source of the media. (block 730). In the illustrated example, the source of the media is a universal resource locator (URL). However, any other source may additionally or alternatively be identified (e.g., a name of the service provider 120, a name of the media provider 110, etc.) In some examples, rather than interacting with the media presenter 162 (e.g., a QuickTime plugin of a browser), the example source determiner 310 implements JavaScript instructions to read a source of a media element (e.g., a hypertext markup language (HTML) video tag).

The example state determiner 315 of the illustrated example interacts with the example media presenter 162 to identify a state of the media presentation. (block 740). In the illustrated example, the example state determiner 315 queries the media presenter 162 for the state of the media presentation (e.g., playing, paused, stopped, etc.). However, any other approach may additionally or alternatively be used such as, for example, processing an image of the media presenter to, for example, detect a presence of a play icon, a presence of a pause icon, etc.

The example metadata processor 320 of the illustrated example then requests metadata associated with the presented media from the request servicer 144 of the example service provider 120. (block 750). In the illustrated example, the example metadata processor 320 transmits the source URL and the current time of the media to the example request servicer 144. Transmitting the source URL and the current time of the media enables the example request servicer 144 to perform a lookup of the metadata associated with the presented media.

The example timestamper 330 of the illustrated example generates a timestamp indicative of a date and/or time that the media presentation data was gathered. (block 760). In the illustrated example, the timestamper 330 determines the date and/or time using a clock of the media device 160. However, in some examples, the timestamper 330 determines the data and/or time by requesting the date and/or time from an external time source, such as a National Institute of Standards and Technology (NIST) Internet Time Service (ITS) server. However, any other approach to determining a timestamp may additionally or alternatively be used.

The example metadata processor 320 of the illustrated example determines a user identifier and/or a device identifier. (block 770). The user and/or device identifier enables identification of a demographic of a user of the media device 160. The example transmitter 350 transmits the gathered media presentation data (e.g., the current time of media information, the duration information, the source information, the state information, the requested metadata obtained from the service provider, and a timestamp) and the user and/or device identifier to the central facility 170. (block 780) In the illustrated example, the media presentation data is transmitted to the central facility 170 using an HTTP Post request. However, any other method of transmitting data and/or metadata may additionally or alternatively be used. Because, in the illustrated example, an HTTP request is used, the transmitter 350 may include cookie data that identifies a user and/or a device that is transmitting the media presentation data (assuming the transmission is to an Internet domain that has set such a cookie). As such, the central facility 170 can identify the user and/or the device as associated with the media presentation. While in the illustrated example an HTTP Post request is used, any other approach to transmitting data may additionally or alternatively be used.

FIG. 8 is a flowchart representative of example machine-readable instructions which may be executed to implement the example service provider 120 of FIGS. 1 and/or 2 to respond to requests for metadata from an example media monitor (e.g., the media monitor 165 of FIGS. 1, 2, and/or 3). While in the illustrated example of FIG. 8 a single instance of responding to a request for metadata is shown, multiple instances (e.g., threads) of the instructions represented by FIG. 8 may be executed in parallel to field multiple requests in parallel from different media devices. The example program 800 of the illustrated example of FIG. 8 begins when the example metadata request servicer 144 receives a request for metadata. (block 810). In the illustrated example, the received request includes a source URL of media and a current time of the media. The example metadata request servicer 144 consults the example metadata reference data store 142 to identify records having a matching source URL to the source URL of the request for metadata. (block 820).

The example metadata request servicer 144 of the illustrated example determines differences between times of the records matching the source URL (e.g., from the example time within media column 420 of the example data table 400 of FIG. 4) and the current time of the media received in the request for metadata. (block 830). The example metadata request servicer 144 selects metadata from the record with the smallest difference between the time of the identified records and the current time of the media in the request for metadata. (block 840). As an example with respect to FIG. 4, if the request for metadata identified a source URL of "SERVICE_PROVIDER.COM/MEDIA1.MPG" and a time of sixteen seconds, the metadata of the second row 460 is returned to the media device, because sixteen seconds is closer to the position of twenty seconds (reflected in the second row 460) than to the position of ten seconds (reflected in the first row 450). However, any other approach to selecting between entries of the metadata table and/or selecting metadata from the table may additionally or alternatively be used. For example, the record having a greatest timestamp that is less than the current time of the media may be selected. For instance, with reference to the example data table 400 of FIG. 4, if the request for metadata identified a source URL of "SERVICE_PROVIDER.COM/MEDIA1.MPG" and a time of sixteen seconds, the metadata of the first example row 450 may be returned to the media device, because sixteen seconds is greater than ten seconds (reflected in the first row 450), but less than twenty seconds (reflected in the second row 460). The example metadata request servicer 144 replies to the request for metadata with the selected metadata. (block 850).

Figure 9:
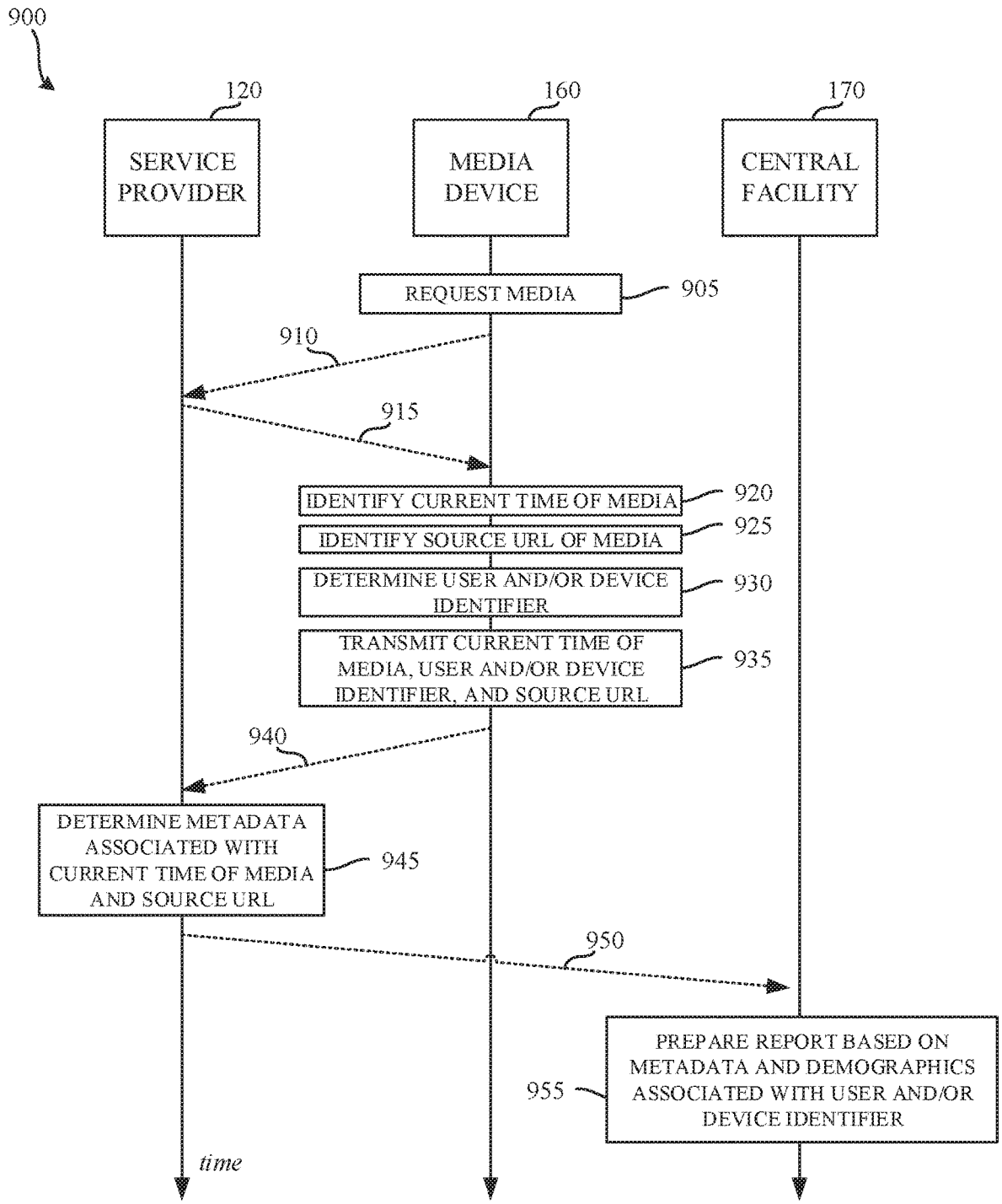
FIG. 9 is an example communication diagram representing interactions between the example service provider, the example media monitor, and/or the example central facility of FIGS. 1, 2, and/or 3.

FIG. 9 is an example communication diagram representing interactions between the example service provider 120, the example media device 160, and/or the example central facility 170 of FIGS. 1, 2, and/or 3. The vertical axis of the example communication diagram 900 represents time. The example communication diagram 900 of the example of FIG. 9 begins when the example media presenter 162 of the media device 160 requests media for presentation based on an instruction in a webpage. (block 905). The example request (line 910) is transmitted to the service provider 120. The service provider 120 responds (line 915) with the requested media. In the illustrated example, the webpage was previously provided by the service provider 120 and includes monitoring instructions for monitoring the media presentation. In the illustrated example, the monitoring instructions implement the example media monitor 165. In some examples, the monitoring instructions are transmitted to the media device when a user signs up to become a panelist and/or installs an application (e.g., an "app") provided by the service provider. However, in some examples, the monitoring instructions are transmitted to the media device as part of the webpage that causes the media device to request the media, such as those instructions described in Blumenau, U.S. Pat. No. 6,108,637, which is incorporated by reference herein.

The example media monitor 165 of the media device 160 of this example executes the monitoring instructions (e.g., JavaScript instructions) to identify a current time of the media (block 920) and identify a source URL of the media (block 925). In some examples the media monitor 165 executes the monitoring instructions in accordance with the teachings of Blumenau, U.S. Pat. No. 6,108,637. The example media monitor 165 determines a user and/or device identifier (block 930) by performing a lookup of the user and/or device identifying information (e.g., from a local memory, from a browser cache, from a cache of the media presenter, etc.). The example media monitor 165 transmits the current time of the media, the source URL and the user and/or device identifier to the example metadata request servicer 144 of the example service provider 120 (block 935) via an HTTP request (line 940).

Based on the information received with the request (line 940), the example request servicer 144 of the service provider 120 determines metadata associated with the time of the media and the source URL (block 945). An example process for determining the metadata is further described in connection with FIG. 11. The example request servicer 144 responds to the request 935 by providing the determined metadata and the user and/or device identifier to the central facility 170. (line 950). The example reporter 172 of the central facility 170 then prepares a report based on the received metadata and demographic information associated with the user and/or device identifier. (block 955). Although only one media device 160 is shown in FIG. 9 for simplicity of explanation, it is expected that most example implementations will have many (e.g., hundreds, thousands, millions, etc.) of devices. Thus, the central facility 170 will receive data from many media devices 160 following the communication pattern shown in FIG. 9. Similarly, although only one service provider 120 is shown in FIG. 9 to simplify the explanation, multiple service providers will be present in many implementations. Moreover, although only one central facility 170 is shown in FIG. 9, many facilities may be provided for collecting the data. In some examples, these data collection facilities are structured in a tiered approach with many satellite collection facilities collecting data and forwarding the same to one or more central facilities 170.

FIG. 10 is a flowchart representative of example machine-readable instructions which may be executed to implement the example media monitor of FIGS. 1, 2, and/or 3. The example program 1000 of the illustrated example of FIG. 10 begins when the example metadata processor 320 determines whether media presentation data should be gathered. (block 1010). In the illustrated example, the example metadata processor 320 determines that media presentation data should be gathered when, for example, a webpage is presented to a user (e.g., upon loading the webpage). However, any other approach to determining whether media presentation data should be gathered may additionally or alternatively be used. For example, the example metadata processor 320 may set a threshold timer to gather media presentation data periodically. Additionally or alternatively, an aperiodic approach may be taken, where the example metadata processor 320 detects media presentation events (e.g., media is loaded for presentation, a user presses a play button, a frame of a video is advanced, etc.) If media presentation data is not to be gathered (block 1010), the metadata processor 320 continues to determine whether media presentation data should be gathered (block 1010).

If media presentation data is to be gathered (block 1010) the example current time of media determiner 305 determines a current time of the media (e.g., a playback time) (block 1020). The example current time of media determiner 305 determines the current time within the media by interacting with the media presenter 162. In the illustrated example, the current time of media determiner 305 is implemented by a JavaScript instruction that queries the current playback position from the media presenter 162. However, any other way of identifying a current position of playback within media may additionally or alternatively be used.

The example duration determiner 307 of the illustrated example determines a duration of the media. (block 1025) In the illustrated example, the duration determiner 307 determines the duration by querying the media presenter 162 for the duration of the media. However, any other approach to identifying a duration of media may additionally or alternatively be used such as, for example, processing a screenshot of the media presenter to identify a duration text (e.g., 5:06, representing media that is five minutes and six seconds in duration).

The example source determiner 310 of the illustrated example interacts with the example media presenter 162 to identify a source of the media. (block 1030). In the illustrated example, the source of the media is a universal resource locator (URL). However, any other source may additionally or alternatively be identified (e.g., a name of the service provider 120, a name of the media provider 110, etc.) In some examples, rather than interacting with the media presenter 162 (e.g., a QuickTime plugin of a browser), the example source determiner 310 implements JavaScript instructions to read a source of a media element (e.g., a hypertext markup language (HTML) video tag).

The example state determiner 315 of the illustrated example interacts with the example media presenter 162 to identify a state of the media presentation. (block 1040). In the illustrated example, the example state determiner 315 queries the media presenter 162 for the state of the media presentation (e.g., playing, paused, stopped, etc.). However, any other approach may additionally or alternatively be used such as, for example, processing an image of the media presenter to, for example, detect a presence of a play icon, a presence of a pause icon, etc.

The example timestamper 330 of the illustrated example generates a timestamp indicative of a date and/or time that the media presentation data was gathered. (block 1050). In the illustrated example, the timestamper 330 determines the date and/or time using a clock of the media device 160. However, in some examples, the timestamper 330 determines the data and/or time by requesting the date and/or time from an external time source, such as a National Institute of Standards and Technology (NIST) Internet Time Service (ITS) server. However, any other approach to determining a timestamp may additionally or alternatively be used.

The example metadata processor 320 of the illustrated example determines a user identifier and/or a device identifier. (block 1060). The user and/or device identifier enables identification of a demographic of a user of the media device 160. The example transmitter 350 transmits the gathered media presentation data (e.g., the current time of media information, the duration information, the source information, the state information, the requested metadata, and a timestamp) and the user and/or device identifier to the service provider 120. (block 1070). In the illustrated example, the media presentation data is transmitted to the service provider 120 using an HTTP Post request. However, any other method of transmitting data and/or metadata may additionally or alternatively be used. Because, in the illustrated example, an HTTP request is used, the transmitter 350 may include cookie data (e.g., in a header of the HTTP request) that identifies a user and/or a device that is transmitting the media presentation data (assuming the transmission is to an Internet domain that has set such a cookie). As shown in the illustrated example of FIG. 9, the example service provider 120 relays the user and/or device identifier to the central facility 170 along with metadata associated with the presented media. As such, the central facility 170 can identify the user and/or the device as associated with the media presentation.

FIG. 11 is a flowchart representative of example machine-readable instructions which may be executed to implement the example service provider 120 of FIGS. 1 and/or 2 to handle a message from the media monitor 165. While in the illustrated example of FIG. 11 a single instance of handling to a message from the media monitor 165 is shown, multiple instances (e.g., threads) of the instructions represented by FIG. 11 may be executed in parallel to field multiple messages in parallel from different media devices. The example program 1100 of the illustrated example of FIG. 11 begins when the example metadata request servicer 144 of the example service provider 120 receives a message from the media monitor 165. (block 1110). In the illustrated example, the received message includes a source URL of media, a current time of the media, and user and/or device identifying information. In the illustrated example, the message is implemented as an HTTP request. However, the message may be implemented in any other fashion. The example metadata request servicer 144 consults the example metadata reference data store 142 to identify records having a matching source URL to the source URL of the request for metadata. (block 1120).

The example metadata request servicer 144 of the illustrated example determines differences between times of the records matching the source URL (e.g., from the example time within media column 420 of the example data table 400 of FIG. 4) and the current time of the media received in the request for metadata. (block 1130). The example metadata request servicer 144 selects metadata from the record with the smallest difference between the time of the identified records and the current time of the media in the request for metadata. (block 1140). As an example with respect to FIG. 4, if the request for metadata identified a source URL of "SERVICE_PROVIDER.COM/MEDIA1.MPG" and a time of sixteen seconds, the metadata of the second row 460 is returned to the media device, because sixteen seconds is closer to the position of twenty seconds (reflected in the second row 460) than to the position of ten seconds (reflected in the first row 450). However, any other approach to selecting between entries of the metadata table and/or selecting metadata from the table may additionally or alternatively be used. For example, the record having a greatest timestamp that is less than the current time of the media may be selected. For instance, with reference to the example data table 400 of FIG. 4, if the request for metadata identified a source URL of "SERVICE_PROVIDER.COM/

MEDIA1.MPG" and a time of sixteen seconds, the metadata of the first example row 450 may be returned to the media device, because sixteen seconds is greater than ten seconds (reflected in the first row 450), but less than twenty seconds (reflected in the second row 460). The example metadata request servicer 144 transmits the metadata and the user and/or device identifying information to the central facility 170. (block 1150).

Figure 12:
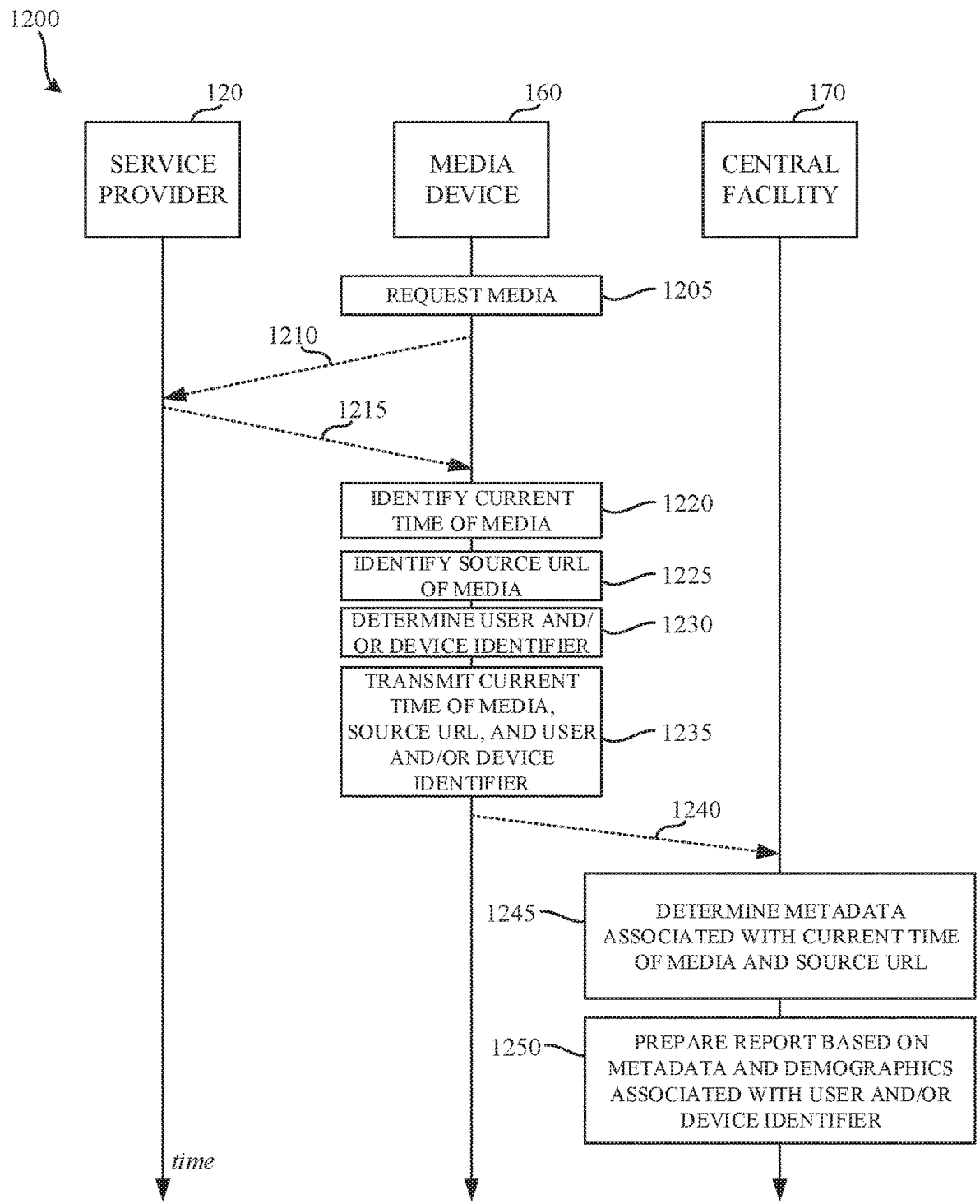
FIG. 12 is an example communication diagram representing interactions between the example service provider, the example media monitor, and/or the example central facility of FIGS. 1, 2, and/or 3.

FIG. 12 is an example communication diagram representing interactions between the example service provider, the example media monitor, and/or the example central facility of FIGS. 1, 2, and/or 3. The vertical axis of the example communication diagram 1200 represents time. The example communication diagram 1200 of the example of FIG. 12 begins when the example media presenter 162 of the media device 160 requests media for presentation based on an instruction in a webpage. (block 1205). The example request (line 1210) is transmitted to the service provider 120. The service provider 120 responds (line 1215) with the requested media. In the illustrated example, the webpage was previously provided by the service provider 120 and includes monitoring instructions for monitoring the media presentation. In the illustrated example, the monitoring instructions implement the example media monitor 165. In some examples, the monitoring instructions are transmitted to the media device when a user signs up to become a panelist and/or installs an application (e.g., an "app") provided by the service provider. However, in some examples, the monitoring instructions are transmitted to the media device as part of the webpage that causes the media device to request the media, such as those instructions described in Blumenau, U.S. Pat. No. 6,108,637, which is incorporated by reference herein.

The example media monitor 165 of the media device 160 of this example executes the monitoring instructions (e.g., JavaScript instruction) to identify a current time of the media (block 1220) and identify a source URL of the media (block 1225). In some examples, the media monitoring 165 executes the monitoring instructions in accordance with the teachings of Blumenau, U.S. Pat. No. 6,108,637. The example media monitor 165 determines a user and/or device identifier (block 1230) by performing a lookup of the user and/or device identifying information (e.g., from a local memory, from a browser cache, from a cache of the media presenter, etc.). The example media monitor 165 transmits the current time of the media, the source URL and the user and/or device identifier to the example metadata request servicer 144 of the example central facility 170 (block 1235) via an HTTP request (line 1240). Although only one media device 160 is shown in FIG. 12 for simplicity of explanation, it is expected that most example implementations will have many (e.g., hundreds, thousands, millions, etc.) of devices. Thus, the central facility 170 will receive data from many media devices 160 following the communication pattern shown in FIG. 12. Similarly, although only one service provider 120 is shown in FIG. 12 to simplify the explanation, multiple service providers will be present in many implementations. Moreover, although only one central facility 170 is shown in FIG. 12, many facilities may be provided for collecting the data. In some examples, these data collection facilities are structured in a tiered approach with many satellite collection facilities collecting data and forwarding the same to one or more central facilities 170.

Based on the information received with the request (line 1240), the example request servicer 144 of the example central facility 170 of FIG. 2 determines metadata associated with the time of the media and the source URL (block 1245).

An example process for determining the metadata is further described in connection with FIG. 15. The example reporter 172 of the central facility 170 then prepares a report based on the received metadata and demographic information associated with the user and/or device identifier. (block 1250).

Figure 13:
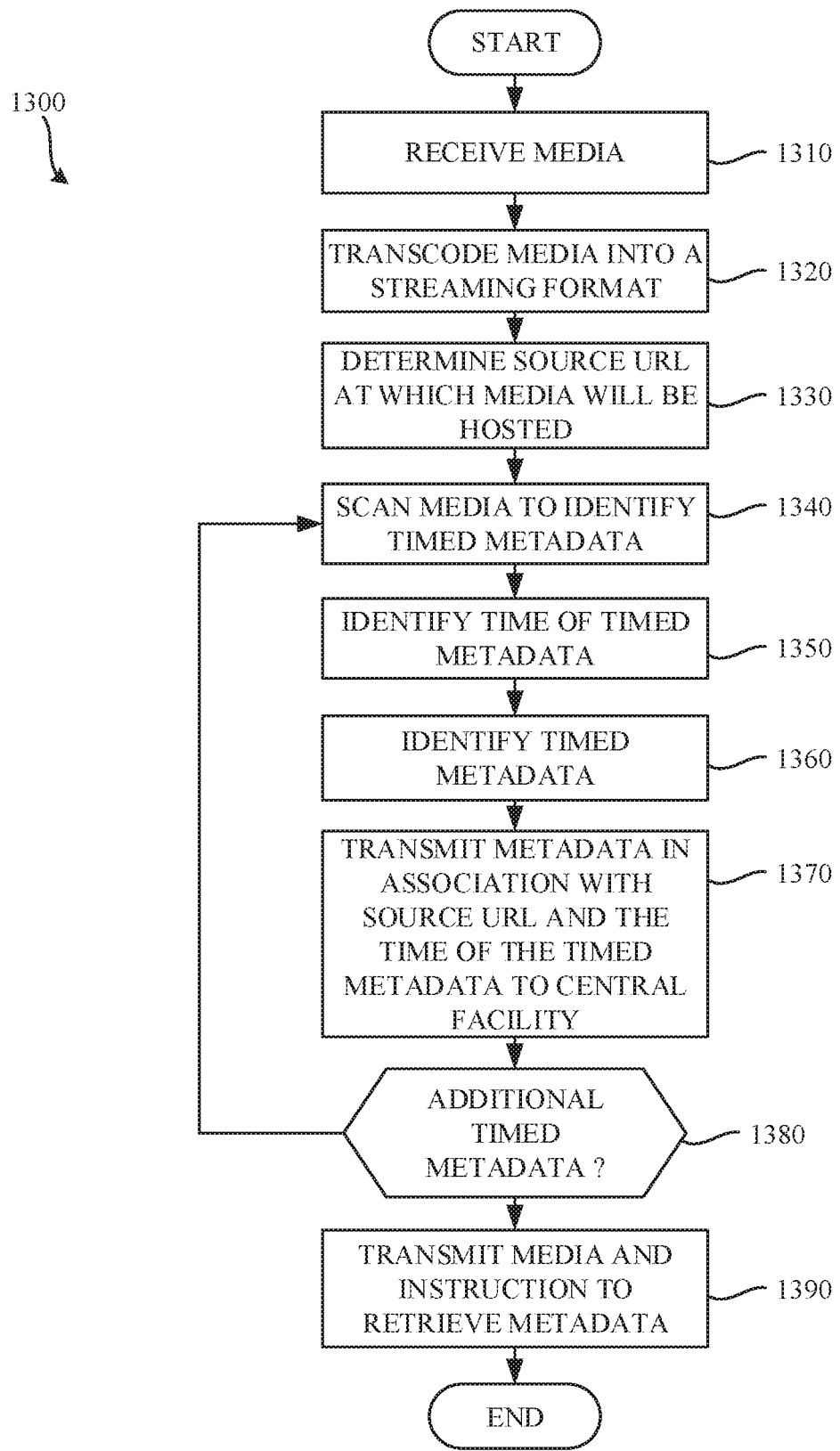
FIG. 13 is a flowchart representative of example machine-readable instructions which may be executed to implement the example service provider of FIGS. 1 and/or 2.

FIG. 13 is a flowchart representative of example machine-readable instructions which may be executed to implement the example service provider 120 of FIGS. 1 and/or 2. Execution of the example machine-readable instructions 1300 of FIG. 13 begins when the example transcoder 122 of the service provider 120 receives the media from the media provider 110 (block 1310). In the illustrated example, the media is received as it is broadcast (e.g., live). However, in some examples, the media is stored and/or cached by the transcoder 122. The media is then transcoded by the transcoder 122 of the service provider 120 (block 1320). In the illustrated example, the media is transcoded into a streaming format (e.g., an MPEG4 transport stream) that may be transmitted via HTTP live streaming (HLS).

The media identifier 125 of the illustrated example then determines a source URL at which the media will be hosted. (block 1330). The example media identifier 125 then scans the media to identify timed media identifying data (block 1340). In some examples, media identifying data (e.g., codes, signatures, etc.) changes throughout a media presentation. For example, first media identifying data used during a first portion of media may be different from second media identifying data used during a second portion of the media. Using different media identifying data at different times enables differentiation between different segments of the media, resulting in a finer grained report as to what users were presented with which parts of the media. Such metadata may be tied to the position of the media, a distribution source of the media, and/or a content of the media (e.g., identifying advertisements, intentionally placed products, actors, events etc.) The example media identifier 125 starts at the beginning of the media and proceeds through the media attempting to identify media identifying data. (block 1340). Once identified, the example media identifier identifies a time of the timed media identifying data. (block 1350).

In the illustrated example, the example media identifier 125 operates on the transcoded media. However, in some examples, the example media identifier 125 identifies the media prior to transcoding. The media identifier 125 operates on the media by extracting media identifying data (e.g., signatures, watermarks, etc.) from the media. Based on the extracted media identifying data, the media identifier 125 generates metadata (block 1360). In the illustrated example, the metadata is generated using an ID3 format. However, any other metadata format may additionally or alternatively be used. Further, in the illustrated example, the metadata is generated by converting the extracted media identifying data to text or other characters. However, in some examples, the metadata may be generated by querying an external source using some or all of the extracted media identifying data and using the metadata returned from the external source as the metadata.

The example media identifier 125 transmits the metadata, the source URL of the media, and the time of the identified timed media identifying data to the example metadata reference data store 142 of the example central facility 170 of FIG. 2. (block 1370). In the illustrated example of FIG. 13, the metadata, source URL, and time are stored in the metadata reference data store 142 of the central facility 170, to later enable the metadata request servicer 144 of the example central facility 170 to determine metadata associated with a media presentation. The example media identifier 125 proceeds to determine if additional timed media identifying data is present. (block 1380). If additional media identifying data is present in the media, the example media identifier 125 continues to scan the media to identify the media identifying data. (block 1340). If no additional media identifying data is present (block 1380), the media is transmitted to a requesting device. In some examples, the media transmission begins before the scanning is complete (e.g., a first, already scanned part of the media is transmitted while a second part of the same media is scanned.)

As noted above, the media is transmitted by the media transmitter 140 of the service provider 120 (block 1390). In the illustrated example, an instruction to retrieve the metadata upon presentation of the media is additionally transmitted. In the illustrated example, the media is transmitted using HTTP live streaming (HLS). However, any other format and/or protocol for transmitting (e.g., broadcasting, unicasting, multicasting, etc.) media may additionally or alternatively be used.

Figure 14:
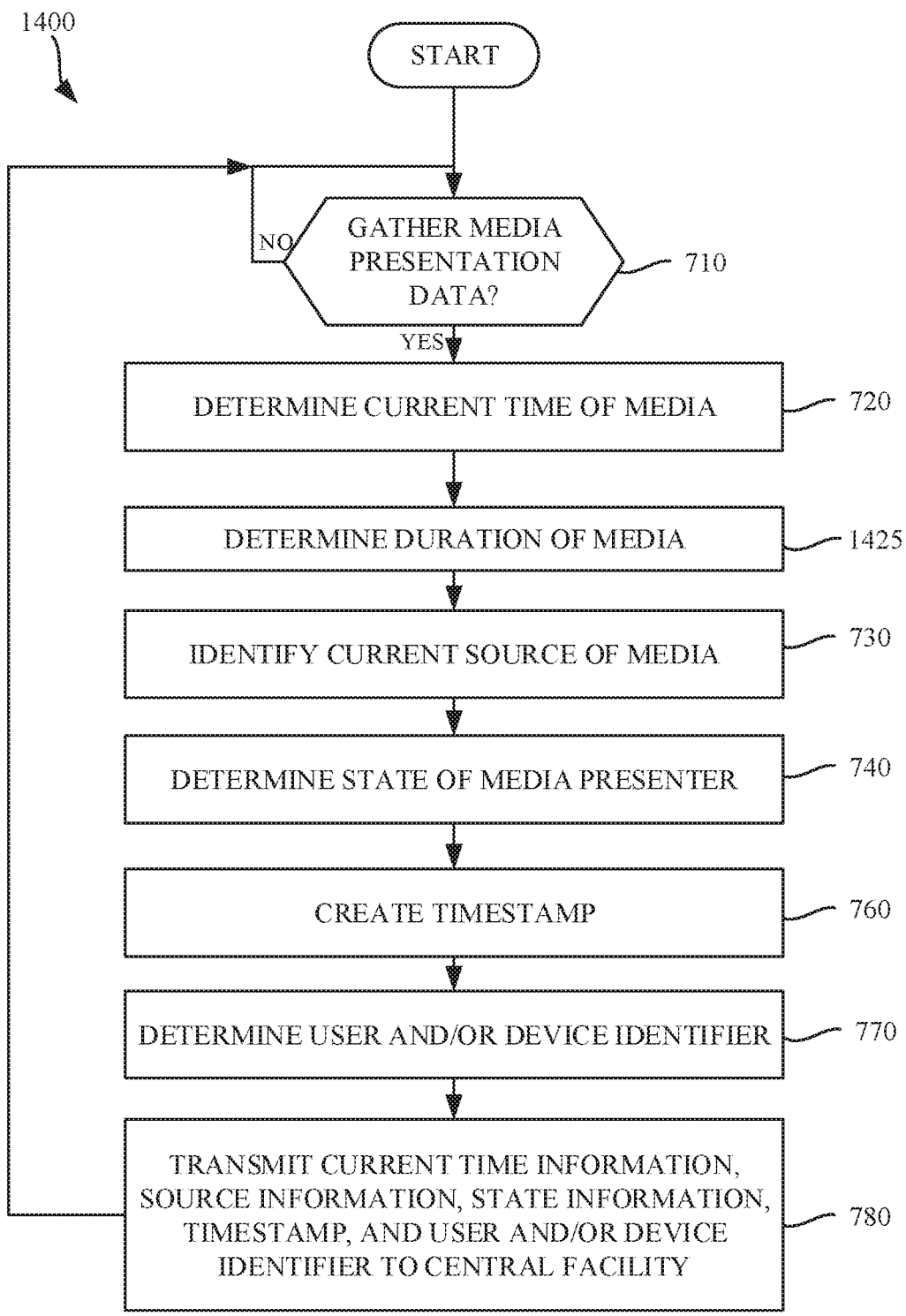
FIG. 14 is a flowchart representative of example machine-readable instructions which may be executed to implement the example media monitor of FIGS. 1, 2, and/or 3.

FIG. 14 is a flowchart representative of example machine-readable instructions which may be executed to implement the example media monitor of FIGS. 1, 2, and/or 3. The example program 1400 of the illustrated example of FIG. 14 begins when the example metadata processor 320 determines whether media presentation data should be gathered. (block 1410). In the illustrated example, the example metadata processor 320 determines that media presentation data should be gathered when, for example, a webpage is presented to a user (e.g., upon loading the webpage). However, any other approach to determining whether media presentation data should be gathered may additionally or alternatively be used. For example, the example metadata processor 320 may set a threshold timer to gather media presentation data periodically. Additionally or alternatively, an aperiodic approach may be taken, where the example metadata processor 320 detects media presentation events (e.g., media is loaded for presentation, a user presses a play button, a frame of a video is advanced, etc.) If media presentation data is not to be gathered (block 1410), the metadata processor 320 continues to determine whether media presentation data should be gathered (block 1410).

If media presentation data is to be gathered (block 1410) the example current time of media determiner 305 determines a current time of the media (e.g., a playback time) (block 1420). The example current time of media determiner 305 determines the current time within the media by interacting with the media presenter 162. In the illustrated example, the current time of media determiner 305 is implemented by a JavaScript instruction that queries the current playback position from the media presenter 162. However, any other way of identifying a current position of playback within media may additionally or alternatively be used.

The example duration determiner 307 of the illustrated example determines a duration of the media. (block 1425) In the illustrated example, the duration determiner 307 determines the duration by querying the media presenter 162 for the duration of the media. However, any other approach to identifying a duration of media may additionally or alternatively be used such as, for example, processing a screenshot of the media presenter to identify a duration text (e.g., 5:06, representing media that is five minutes and six seconds in duration).

The example source determiner 310 of the illustrated example interacts with the example media presenter 162 to identify a source of the media. (block 1430). In the illustrated example, the source of the media is as a universal resource locator (URL). However, any other source may additionally or alternatively be identified (e.g., a name of the service provider 120, a name of the media provider 110, etc.) In some examples, rather than interacting with the media presenter 162 (e.g., a QuickTime plugin of a browser), the example source determiner 310 implements JavaScript instructions to read a source of a media element (e.g., a hypertext markup language (HTML) video tag).

The example state determiner 315 of the illustrated example interacts with the example media presenter 162 to identify a state of the media presentation. (block 1440). In the illustrated example, the example state determiner 315 queries the media presenter 162 for the state of the media presentation (e.g., playing, paused, stopped, muted, etc.). However, any other approach may additionally or alternatively be used such as, for example, processing an image of the media presenter to, for example, detect a presence of a play icon, a presence of a pause icon, etc. The state of the media presentation is useful because, for example, it enables the central facility 170 to separately credit media presentations based on the state of the media presentation. For example, media that was detected, but paused, may receive no credit; media that was detected, but muted, may receive partial credit; while media that was detected and playing may receive full credit.

The example timestamper 330 of the illustrated example generates a timestamp indicative of a date and/or time that the media presentation data was gathered. (block 1460). In the illustrated example, the timestamper 330 determines the date and/or time using a clock of the media device 160. However, in some examples, the timestamper 330 determines the data and/or time by requesting the date and/or time from an external time source, such as a National Institute of Standards and Technology (NIST) Internet Time Service (ITS) server. However, any other approach to determining a timestamp may additionally or alternatively be used.

The example metadata processor 320 of the illustrated example determines a user identifier and/or a device identifier. (block 1470). The user and/or device identifier enables identification of a demographic of a user of the media device 160. The example transmitter 350 transmits the gathered media presentation data (e.g., the current time of media information, the duration information, the source information, the state information, and a timestamp) and the user and/or device identifier to the central facility 170. (block 1480) In the illustrated example, the media presentation data is transmitted to the central facility 170 using an HTTP Post request. However, any other method of transmitting data and/or metadata may additionally or alternatively be used. Because, in the illustrated example, an HTTP request is used, the transmitter 350 may include cookie data that identifies a user and/or a device that is transmitting the media presentation data (assuming the transmission is to an Internet domain that has set such a cookie). As such, the central facility 170 can identify the user and/or the device as associated with the media presentation, as well as identify metadata associated with the media presentation. While in the illustrated example an HTTP Post request is used, any other approach to transmitting data may additionally or alternatively be used.

FIG. 15 is a flowchart representative of example machine-readable instructions which may be executed to implement the example central facility 170 of FIGS. 1 and/or 2. While in the illustrated example of FIG. 15 a single instance of responding to a message from the media monitor 165 is shown, multiple instances (e.g., threads) of the instructions represented by FIG. 15 may be executed in parallel to field multiple requests in parallel from different media devices. The example program 1500 of the illustrated example of FIG. 15 begins when the example metadata request servicer 144 of the example central facility 170 of FIG. 2 receives a message from the media monitor 165. (block 1510). In the illustrated example, the received message includes a source URL of media, a current time of the media, and user and/or device identifying information. In the illustrated example, the message is implemented as an HTTP request. However, the message may be implemented in any other fashion. The example metadata request servicer 144 consults the example metadata reference data store 142 to identify records having a matching source URL to the source URL of the request for metadata. (block 1520).

The example metadata request servicer 144 of the illustrated example determines differences between times of the records matching the source URL (e.g., from the example time within media column 420 of the example data table 400 of FIG. 4) and the current time of the media received in the request for metadata. (block 1530). The example metadata request servicer 144 selects metadata from the record with the smallest difference between the time of the identified records and the current time of the media in the request for metadata. (block 1540). As an example with respect to FIG. 4, if the request for metadata identified a source URL of "SERVICE_PROVIDER.COM/MEDIA1.MPG" and a time of sixteen seconds, the metadata of the second row is selected, because sixteen seconds is closer to the position of twenty seconds (reflected in the second row 460) than to the position of ten seconds (reflected in the first row 450). However, any other approach to selecting between entries of the metadata table and/or selecting metadata from the table may additionally or alternatively be used. For example, the record having a greatest timestamp that is less than the current time of the media may be selected. For instance, with reference to the example data table 400 of FIG. 4, if the request for metadata identified a source URL of "SERVICE_PROVIDER.COM/MEDIA1.MPG" and a time of sixteen seconds, the metadata of the first row 450 may be selected, because sixteen seconds is greater than ten seconds (reflected in the first row 450), but less than twenty seconds (reflected in the second row 460). The example reporter 172 of the central facility 170 then prepares a report based on the selected metadata and demographic information associated with the user and/or device identifier. (block 1550).

Figure 16:
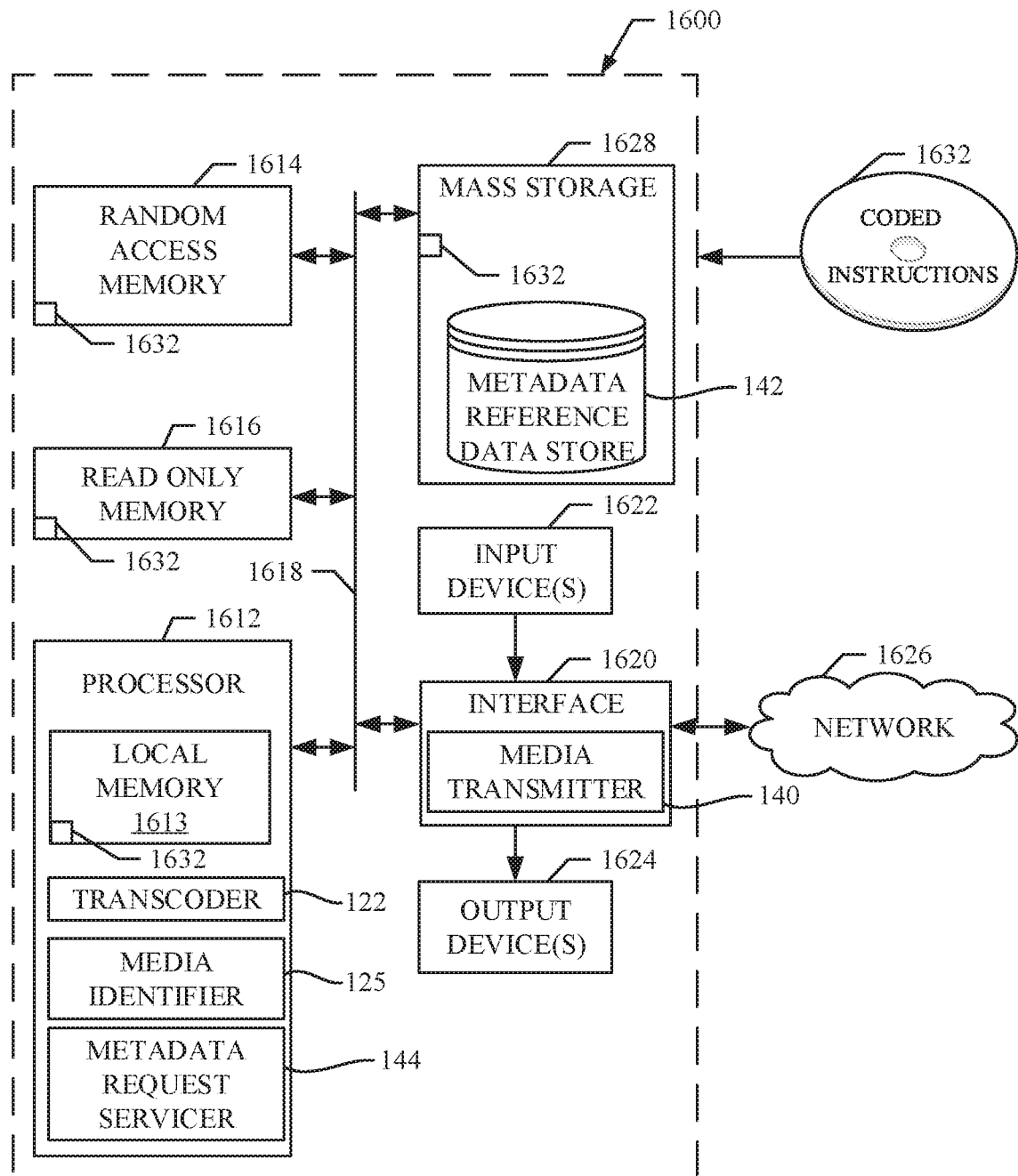
FIG. 16 is a block diagram of an example server structured to execute the example machine-readable instructions of FIGS. 6, 8, 11, and/or 13 to implement the example service provider of FIGS. 1 and/or 2.

FIG. 16 is a block diagram of an example processor platform 120 structured to execute the instructions of FIGS. 6, 8, 11, and/or 13 to implement the example service provider 120 of FIGS. 1 and/or 2. The processor platform 120 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 120 of the illustrated example includes a processor 1612. The processor 1612 of the illustrated example is hardware. For example, the processor 1612 can be implemented by one or more integrated circuits, logic circuits, microprocessors, or controllers from any desired family or manufacturer.

The processor 1612 of the illustrated example includes a local memory 1613 (e.g., a cache), and executes instructions to implement the example transcoder 122, the example media identifier 125, and/or the example metadata request servicer 144. The processor 1612 of the illustrated example is in communication with a main memory including a volatile memory 1614 and a non-volatile memory 1616 via a bus 1618. The volatile memory 1614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1616 may be implemented by flash memory and/or any other desired type of memory device. Access to the main memory 1614, 1616 is controlled by a memory controller The processor platform 120 of the illustrated example also includes an interface circuit 1620. The interface circuit 1620 may be implemented by any type of interface standard, such as an Ethernet interface, a universal serial bus (USB), and/or a PCI express interface.

In the illustrated example, one or more input devices 1622 are connected to the interface circuit 1620. The input device(s) 1622 permit(s) a user to enter data and commands into the processor 1612. The input device(s) can be implemented by, for example, an audio sensor, a microphone, a camera (still or video), a keyboard, a button, a mouse, a touchscreen, a track-pad, a trackball, and/or a voice recognition system.

One or more output devices 1624 are also connected to the interface circuit 1620 of the illustrated example. The output devices 1624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1620 of the illustrated example, thus, typically includes a graphics driver card, a graphics driver chip or a graphics driver processor.

The interface circuit 1620 of the illustrated example also includes a communication device such as a transmitter, a receiver, a transceiver, a modem and/or network interface card to facilitate exchange of data with external machines (e.g., computing devices of any kind) via a network 1626 (e.g., an Ethernet connection, a digital subscriber line (DSL), a telephone line, coaxial cable, a cellular telephone system, etc.). The interface circuit 1620 implements the example media transmitter 140.

The processor platform 120 of the illustrated example also includes one or more mass storage devices 1628 for storing software and/or data. Moreover, the example mass storage device(s) 1628 includes the metadata reference data store 142. Examples of such mass storage devices 1628 include floppy disk drives, hard drive disks, compact disk drives, Blu-ray disk drives, RAID systems, and digital versatile disk (DVD) drives.

The coded instructions 1632 of FIGS. 6, 8, 11, and/or 13 may be stored in the mass storage device 1628, in the volatile memory 1614, in the non-volatile memory 1616, and/or on a removable tangible computer readable storage medium such as a CD or DVD.

Figure 17:
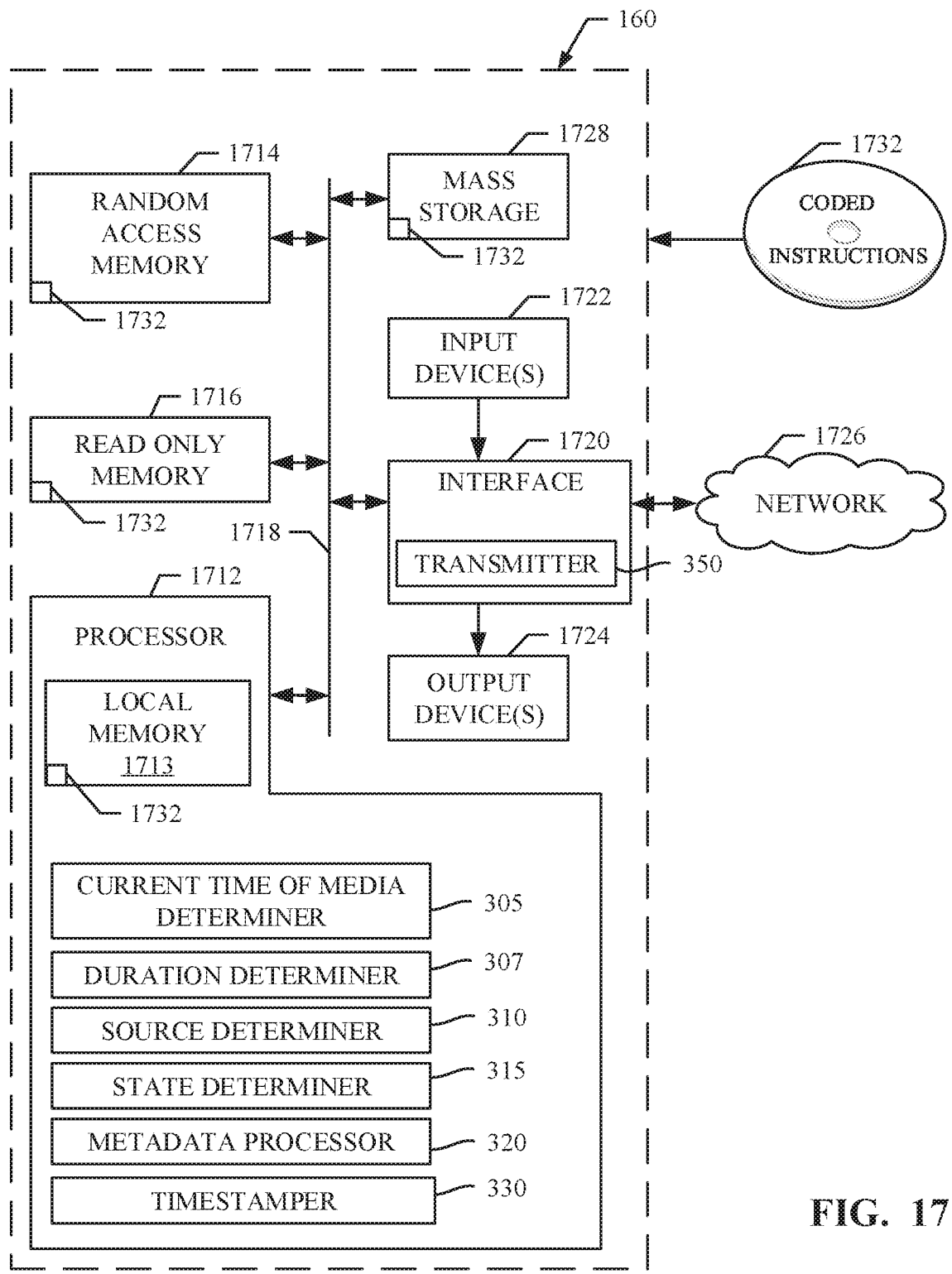
FIG. 17 is a block diagram of an example media device structured to execute the example machine-readable instructions of FIGS. 7, 10, and/or 14 to implement the example media monitor of FIGS. 1, 2, and/or 3.

FIG. 17 is a block diagram of an example processor platform 160 structured to execute the instructions of FIGS. 7, 10, and/or 14 to implement the example media monitor 165 of FIGS. 1, 2, and/or 3. The processor platform 160 can be, for example, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 160 of the illustrated example includes a processor 1712. The processor 1712 of the illustrated example is hardware. For example, the processor 1712 can be implemented by one or more integrated circuits, logic circuits, microprocessors, or controllers from any desired family or manufacturer.

The processor 1712 of the illustrated example includes a local memory 1713 (e.g., a cache), and executes instruction to implement the example current time of media determiner 305, the example duration determiner 307, the example source determiner 310, the example state determiner 315, the example metadata processor 320, and/or the example timestamper 330. The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 160 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.). The interface circuit 1720 implements the example transmitter 350.

The processor platform 160 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

The coded instructions 1732 of FIGS. 7, 10, and/or 14 may be stored in the mass storage device 1728, in the volatile memory 1714, in the non-volatile memory 1716, and/or on a removable tangible computer readable storage medium such as a CD or DVD.

Figure 18:
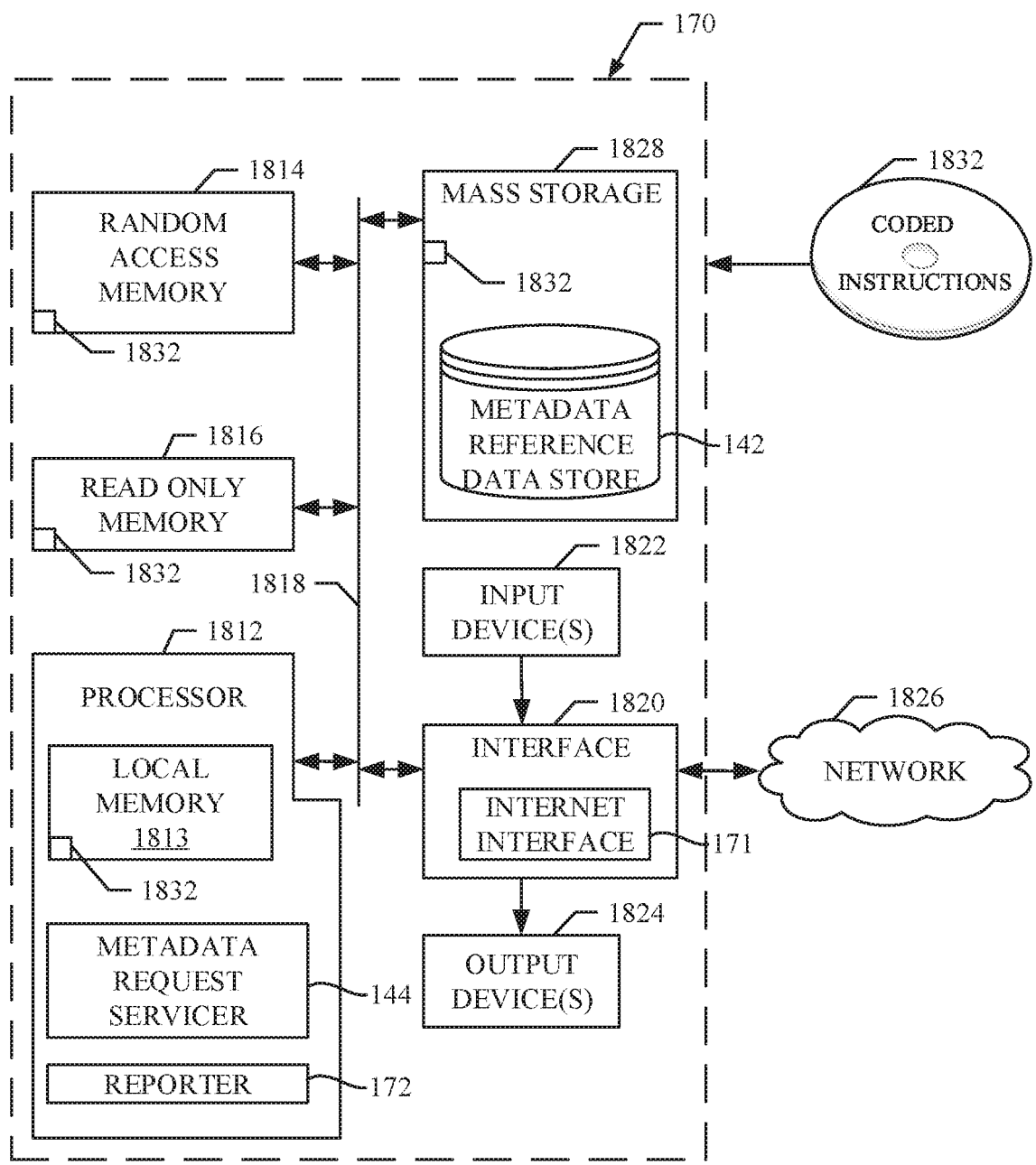
FIG. 18 is a block diagram of an example server structured to execute the example machine-readable instructions of FIG. 15 to implement the example central facility of FIGS. 1 and/or 2.

FIG. 18 is a block diagram of an example processor platform 170 structured to execute the instructions of FIG. 15 to implement the example central facility 170 of FIGS. 1 and/or 2. The processor platform 170 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 170 of the illustrated example includes a processor 1812. The processor 1812 of the illustrated example is hardware. For example, the processor 1812 can be implemented by one or more integrated circuits, logic circuits, microprocessors, or controllers from any desired family or manufacturer.

The processor 1812 of the illustrated example includes a local memory 1813 (e.g., a cache), and executes instructions to implement the example metadata request servicer 144, and/or the example reporter 172. The processor 1812 of the illustrated example is in communication with a main memory including a volatile memory 1814 and a non-volatile memory 1816 via a bus 1818. The volatile memory 1814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processor platform 170 of the illustrated example also includes an interface circuit 1820. The interface circuit 1820 may be implemented by any type of interface standard, such as an Ethernet interface, a universal serial bus (USB), and/or a PCI express interface.

In the illustrated example, one or more input devices 1822 are connected to the interface circuit 1820. The input device(s) 1822 permit(s) a user to enter data and commands into the processor 1812. The input device(s) can be implemented by, for example, an audio sensor, a microphone, a camera (still or video), a keyboard, a button, a mouse, a touchscreen, a track-pad, a trackball, and/or a voice recognition system.

One or more output devices 1824 are also connected to the interface circuit 1820 of the illustrated example. The output devices 1824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1820 of the illustrated example, thus, typically includes a graphics driver card, a graphics driver chip or a graphics driver processor.

The interface circuit 1820 of the illustrated example also includes a communication device such as a transmitter, a receiver, a transceiver, a modem and/or network interface card to facilitate exchange of data with external machines (e.g., computing devices of any kind) via a network 1826 (e.g., an Ethernet connection, a digital subscriber line (DSL), a telephone line, coaxial cable, a cellular telephone system, etc.). The interface circuit 1820 implements the example internet interface 171.

The processor platform 170 of the illustrated example also includes one or more mass storage devices 1828 for storing software and/or data. Moreover, the example mass storage device(s) 1828 includes the metadata reference data store 142. Examples of such mass storage devices 1828 include floppy disk drives, hard drive disks, compact disk drives, Blu-ray disk drives, RAID systems, and digital versatile disk (DVD) drives.

The coded instructions 1832 of FIG. 15 may be stored in the mass storage device 1828, in the volatile memory 1814, in the non-volatile memory 1816, and/or on a removable tangible computer readable storage medium such as a CD or DVD.

From the foregoing, it will be appreciated that methods, apparatus and articles of manufacture have been disclosed which enable measurement of exposure to streaming media. Example approaches disclosed herein enable collection of media presentation data upon loading of the media. These example approaches are beneficial over prior known systems because they enable detection of media that is not yet presented, as compared to detecting media once it is presented (e.g., after presentation begins). This is useful because, for example, it enables monitoring of media that was available for presentation to a user, but the user did not begin presentation.

Moreover, example methods, apparatus, and articles of manufacture disclosed herein reduce processing requirements as compared with known systems for accessing metadata associated with media. Some known systems for accessing media identifying information at a consumer's media device require the consumer's media device to process the media to extract a code, signature, watermark, etc. from the media itself. Such extraction is a processor intensive task which consumes time, battery power, etc., and, when performed by a media device with limited processing resources, can potentially cause the consumer's device to perform poorly. Accessing the metadata by transmitting a source URL of the media and a time within the media to a metadata request servicer reduces the processing requirements of the consumer media device, thereby reducing the amount of time, battery power, etc. consumed by the monitoring efforts of the media device.

Some other known systems require the media device to access metadata supplied with media by, for example, inspecting a timed text track, inspecting a metadata channel of the media, inspecting an encryption key of the media, etc. However, access to such metadata is not implemented consistently across various platforms (e.g., different operating systems, different browsers, etc.). For some platforms, access to such information (e.g., via a metadata channel, via a timed text track, etc.) is prohibited. As disclosed herein, metadata associated with media can be identified based on identification of a time within the media and a source URL of the media. Identifying the time within the media and the source URL of the media are tasks that are typically not restricted by media presentation applications, resulting in less missed instances where media monitoring would occur.

Moreover, the example methods, apparatus, and articles of manufacture disclosed herein present a cross-platform approach, as JavaScript instructions are reliably executed by a large variety of different media devices, resulting in less missed instances where media monitoring would occur. Further still, implementing the instructions as JavaScript instructions results in a wider range of users who may be monitored, including users who are not panelists. Monitoring users who are not panelists further results in less missed instances where media monitoring would occur. Because less instances where media monitoring would occur are missed (i.e., more instances are monitored), less projection and/or extrapolation is required to prepare reports about the media. These reduced projections and/or extrapolations result in reduced processing and/or memory requirements of the reporter preparing such reports.

Moreover, the example methods, apparatus, and articles of manufacture disclosed herein do not require metadata to be transmitted with the media (e.g., in a timed text track, in a metadata channel, etc.). Instead, example methods, apparatus, and articles of manufacture disclosed herein cause a consumer device to request metadata when monitoring is to occur. Requesting and/or receiving metadata when monitoring is to occur reduces bandwidth used by the media device. Also, executing an instruction to request metadata from a request servicer is far less processor usage intensive than identifying media and/or detecting media identifying metadata such as codes and/or signatures. As a result, demand on the processor of the consumer media device is reduced, thereby avoiding interference with other operations of the consumer media device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to measure exposure to streaming media, the apparatus comprising:
  a memory; and
  a logic circuit to:
    cause transmission of media, received from a service provider, to a media device in response to a first request for the media, the media including instructions to cause the media device to (1) determine a source Uniform Resource Locator, (2) determine a current playback time of the media, and (3) transmit a second request for metadata of the media to the apparatus; and
    cause transmission, to the media device in response to the second request, of metadata associated with the source Uniform Resource Locator and the current playback time of the media, the second request including the source Uniform Resource Locator of the media and the current playback time of the media.

2. The apparatus as defined in claim 1, wherein the second request is a hyper-text transport protocol (HTTP) request.

3. The apparatus as defined in claim 1, wherein the metadata is formatted using an ID3 format and the media is transcoded into an MPEG4 transport stream.

4. The apparatus as defined in claim 1, wherein the instructions are to further cause the media device to transmit the received metadata to an audience measurement collection facility.

5. The apparatus as defined in claim 1, wherein the metadata corresponds to at least one of a position of the media, a distribution source of the media, or a content of the media.

6. The apparatus as defined in claim 1, wherein the media is transmitted to the media device via HTTP live streaming (HLS).

7. The apparatus as defined in claim 1, wherein the instructions are located within a webpage transmitted to the media device.

8. A method of measuring exposure to streaming media, the method comprising:
  transmitting media received from a service provider to a media device in response to a first request for the media, the media including instructions to cause the media device to (1) determine a source Uniform Resource Locator, (2) determine a current playback time of the media, and (3) transmit a second request for metadata of the media to the apparatus; and transmitting, to the media device in response to the second request, metadata associated with the source Uniform Resource Locator and the current playback time of the media, the second request for the metadata of the media, the second request including the source Uniform Resource Locator of the media and the current playback time of the media.

9. The method as defined in claim 8, wherein the second request is a hyper-text transport protocol (HTTP) request.

10. The method as defined in claim 8, wherein the media is transcoded into an MPEG4 transport stream.

11. The method as defined in claim 8, wherein the metadata is formatted using an ID3 format and the media identifying data is at least one of codes or signatures.

12. The method as defined in claim 8, wherein the metadata corresponds to at least one of a position of the media, a distribution source of the media, or a content of the media.

13. The method as defined in claim 8, wherein the media is transmitted to the media device via HTTP live streaming (HLS).

14. The method as defined in claim 8, wherein the instructions are located within a webpage transmitted to the media device.

15. An apparatus to measure exposure to streaming media, the apparatus comprising:

means for transmitting to transmit the media received from a service provider to a media device in response to a first request for the media, the media including instructions to cause the media device to (1) determine a source Uniform Resource Locator, (2) determine a current playback time of the media, and (3) transmit a second request for metadata of the media to the apparatus; and means for servicing a metadata request, including:

receiving, from the media device, the second request for the metadata of the media, the second request including the source Uniform Resource Locator of the media and the current playback time of the media; and transmitting, to the media device in response to the second request, metadata associated with the source Uniform Resource Locator and the current playback time of the media.

16. The apparatus as defined in claim 15, wherein the second request is a hyper-text transport protocol (HTTP) request.

17. The apparatus as defined in claim 15, wherein the metadata is formatted using an ID3 format and the media is transcoded into an MPEG4 transport stream.

18. The apparatus as defined in claim 15, further including transmitting the received metadata to an audience measurement collection facility.

19. The apparatus as defined in claim 15, wherein the metadata corresponds to at least one of a position of the media, a distribution source of the media, or a content of the media.

20. The apparatus as defined in claim 15, wherein the media is transmitted to the media device via HTTP live streaming (HLS).

21. An apparatus to measure exposure to streaming media, the apparatus comprising:

a memory;

instructions in the apparatus; and a processor to execute the instructions to:

cause transmission of media, received from a service provider, to a media device in response to a first request for the media, the media including instructions to cause the media device to (1) determine a source Uniform Resource Locator, (2) determine a current playback time of the media, and (3) transmit a second request for metadata of the media to the apparatus; and cause transmission, to the media device in response to the second request, of metadata associated with the source Uniform Resource Locator and the current playback time of the media, the second request including the source Uniform Resource Locator of the media and the current playback time of the media.

* * * * *